US012778831B2

(12) United States Patent

Benda et al.

(10) Patent No.: US 12,778,831 B2
(45) Date of Patent: Nov. 3, 2026

(54) ARTICULATING FOOTPLATE APPARATUS

(71) Applicant: Healing Innovations, Inc., Nashville, TN (US)

(72) Inventors: Scott Douglas Benda, Hendersonville, TN (US); Benjamin Howland Taylor, Nashville, TN (US); Julie Frances Hartman, Colorado Springs, CO (US)

(73) Assignee: Healing Innovations, Inc., Nashville, TN (US)

(*) Notice: Subject to any disclaimer, the term of this patent is extended or adjusted under 35 U.S.C. 154(b) by 574 days.

(21) Appl. No.: 18/467,625

(22) Filed: Sep. 14, 2023

(65) Prior Publication Data

US 2025/0090403 A1 Mar. 20, 2025

(51) Int. Cl.
*A61H 1/02* (2006.01)

(52) U.S. Cl.
CPC ... *A61H 1/0262* (2013.01); *A61H 2201/1642* (2013.01)

(58) Field of Classification Search
CPC ................. B25J 9/0006; A61H 1/0266; A61H 1/0237–0244; A61H 1/0262; A61H 2003/001; A61H 3/00; A61H 2205/00; A61H 2203/00; A61H 2201/1642; A61F 5/00
See application file for complete search history.

(56) References Cited

U.S. PATENT DOCUMENTS

| | | | | |
|---|---|---|---|---|
| 8,439,854 | B2 * | 5/2013 | Terrio | A61H 1/0266 482/79 |
| 9,603,768 | B1 * | 3/2017 | Widmer | A61H 1/024 |
| 11,344,086 | B2 * | 5/2022 | Fiedler | A44B 11/258 |
| 12,433,777 | B2 * | 10/2025 | Aoki | A61F 5/0123 |
| 2014/0020690 | A1 * | 1/2014 | Triplett | A61G 13/128 128/845 |
| 2019/0030707 | A1 * | 1/2019 | Chen | B25J 9/0078 |
| 2019/0282424 | A1 * | 9/2019 | Lerner | A61H 1/00 |

FOREIGN PATENT DOCUMENTS

| | | | | |
|---|---|---|---|---|
| CN | 109464264 A | * | 3/2019 | A61H 1/0262 |
| CN | 109528440 A | * | 3/2019 | A61H 3/00 |
| WO | WO-2019106153 A1 | * | 6/2019 | A61F 5/01 |

* cited by examiner

*Primary Examiner* — Brandy S Lee
*Assistant Examiner* — Aislinn M Jones
(74) *Attorney, Agent, or Firm* — Bradley Arant Boult Cummings LLP; Daniel E. Sineway, Esq.

(57) ABSTRACT

An articulating footplate assembly for a gait training system is disclosed. The footplate assembly can include a footplate base configured to support a user's foot and a lower leg support assembly configured to extend along a portion of the user's leg. The lower leg support assembly can include a footplate base connector attachable to the footplate base and a pivoting mechanism. The pivoting mechanism can comprise a pivot point and a rotation selection device configured to selectively permit rotation about the pivot point, the rotation selection device comprising a plurality of discrete rotation settings, and each rotation setting being configured to permit rotation about the pivot point along a corresponding predetermined angular distance.

18 Claims, 15 Drawing Sheets

ARTICULATING FOOTPLATE APPARATUS

TECHNICAL FIELD

This application generally relates to an articulating footplate apparatus and more specifically to an articulating footplate apparatus used for training (e.g., rehabilitating and/or re-teaching) various gait motions.

BACKGROUND

Accidents (e.g., motor vehicle incidents and sporting injuries) and natural illnesses (e.g., birth anomalies and diseases) can cause serious physical impairment in an individual. A physical impairment that affects an individual's ability to walk and/or perform a correct gait cycle can have serious impacts on the individual's day to day life. The gait cycle can define a series of specific movements performed by the human body to facilitate a walking motion. Physical therapy is a common recovery technique employed by doctors and/or trained individuals to teach or reteach a patient how to walk. Given the complex nature of the gait cycle, trained individuals try to isolate various portions of the body to train localized movements.

Training by a physical therapist can focus on the movements performed by the lower leg and feet. The lower leg and feet play a vital role in the gait cycle and can require significant attention during physical therapy. For example, the pivoting of the fibula and tibia about the knee joint is a crucial movement in the gait cycle. Current systems for aiding gait training programs are incapable of isolating various movements performed in the gait cycle, and there are no mechanisms for practicing specific limited movements performed in the gait cycle. Additionally, current systems are incapable of isolating the movements performed by the lower leg and foot to aid a patient during physical therapy.

Therefore, there is a long-felt but unresolved need for a system or apparatus that can isolate movements in the lower leg and feet, allow a user to change between various motions for training different stages of the gait cycle, and provide variable degrees of aid to the patient during a particular rehabilitation procedure.

BRIEF SUMMARY OF THE DISCLOSURE

Briefly described, aspects of the present disclosure generally relate to systems and methods for promoting various types of movements performed by a user during gait training exercises. The disclosed system can aid localized movements performed by a lower leg and foot of the user. The lower leg can be defined as the portion of the leg below the knee joint and above the ankle joint. The disclosed system can include an articulating footplate. The articulating footplate can attach to a gait training machine. The gait training machine can be defined as a motorized system that can aid and/or guide a user when performing full body training during rehabilitation procedures and gait training exercises. The gait training machine can isolate motions to train specific sequences of a gait cycle, provide various levels of aid to the user, and guide the user through repeated completions of the gait cycle. The gait cycle can be defined as the motion performed by a human when walking.

The gait training machine can include two articulating footplates for each leg of the user. The gait training machine can support the weight of the user as the user places each foot on each of the respective articulating footplates. The gait training machine can employ the motorized system to move the two articulating footplates, among other components, in a motion substantially similar to the gait cycle. For example, the gait training machine can push and/or pull each foot of the user to mimic a foot's normal motion during the gait cycle. Continuing this example, as the gait training machine pushes and pulls the feet of the user, the articulating footplate can support the leg of the user while allowing the user to perform motions common to the gait cycle.

The articulating footplate can include a footplate base, a lower leg support arm, and a shin support. The articulating footplate can accept the foot of the user. For example, the user can place their foot on the footplate base. The articulating footplate can secure the foot and lower leg of the user using the footplate base and the shin support, respectively. For example, the footplate base can include one or more straps to secure the foot of the user to the footplate base. Continuing this example, the shin support can confine the lower leg of the user in a particular position such that the lower leg can move freely but cannot move outside of the bounds of the shin support. The lower leg support arm can extend perpendicularly from the footplate base and can extend parallel to the lower leg of the user.

The articulating footplate can promote isolated movements of the lower leg and feet. For example, the articulating footplate can induce one or more distinct motions in the lower leg and feet. Continuing this example, each of the one or more distinct motions promoted by the articulating footplate can increase the freedom of movement of the lower leg and feet while reducing the articulating footplate's assistance to the user. A physical trainer and/or the user can vary between the one or more motions induced by the articulating footplate depending on the type of exercise performed by the user and/or the desired level of assistance provided by the articulating footplate.

The articulating footplate can include a pivoting mechanism to promote the one or more distinct motions performed by the articulating footplate. The pivoting mechanism can include a hinge and a motion selection plate. The hinge can form a connection between a footplate base connector and the lower leg support arm. The hinge can allow the foot of the user to perform a dorsiflexion motion and a plantarflexion motion about an ankle joint of the user. For example, the hinge can be located adjacent to the ankle joint and can allow the lower leg support arm to pivot relative to the footplate base to promote the dorsiflexion motion and/or the plantarflexion motion in the foot of the user.

The motion selection plate can restrict the motions performed by the foot relative to the ankle joint of the user. For example, the motion selection plate can include a first position. In the first position, the motion selection plate can fix the hinge such that the footplate base can be perpendicular to the lower leg support arm. In the first position, the foot of the user is constantly held in a neutral position. In the neutral position, the foot of the user can be constantly perpendicular to the lower leg of the user (e.g., the fibula). In another example, the motion selection plate can include a second position. In the second position, the motion selection plate can restrict the hinge such that the footplate base can only perform a plantarflexion motion. In yet another example, the motion selection plate can include a third position. In the third position, the motion selection plate can restrict the hinge such that the footplate base can only perform a dorsiflexion motion. In yet another example, the motion selection plate can include a fourth position. In the fourth position, the motion selection plate can allow the footplate base to freely rotate about the hinge to promote both the plantarflexion motion and the dorsiflexion motion.

The disclosed technology includes an articulating footplate apparatus, which can include a footplate base and a lower leg support assembly. The foot plate base can comprise a top surface configured to support a foot of a user. The lower leg support assembly can be configured to extend along a portion of a leg of the user, and the lower leg support assembly can comprise: a first end and a second end opposite the first end; a footplate base connector located at the first end, the footplate base connector being attachable to the footplate base; and a pivoting mechanism. The pivoting mechanism can comprise: a pivot point; and a rotation selection device configured to selectively permit rotation about the pivot point, the rotation selection device comprising a plurality of discrete rotation settings, each rotation setting being configured to permit rotation about the pivot point along a corresponding predetermined angular distance.

The footplate base connector can be detachably attachable to the footplate base.

The footplate base can comprise a locking mechanism extending perpendicularly from the footplate base. The locking mechanism can be configured to receive at least a portion of the footplate base connector of the lower leg support assembly.

The locking mechanism can comprise: a locking enclosure; a locking port extending into the locking enclosure; a protruding portion configured to at least partially insert into a notch or recess of the footplate base connector; a spring biased to force the protruding portion against the notch or recess of the footplate base connector; and a release portion configured to release the footplate base connector from the locking mechanism.

The release portion can comprise a lever configured to selectively compress the spring and permit the protruding portion to move out of the notch or recess of the footplate base connector to thereby release the footplate base connector from the locking mechanism.

The lower leg support assembly can comprise a shin support located proximate the second end of the lower leg support assembly. The shin support being configured to provide resistance against the leg of the user when the articulating footplate rotates about the pivot point.

The shin support can comprise: a cushion; and a leg strap are configured to restrain the leg of the user against the cushion.

The shin support can further comprise: a depth adjustment plate configured to slideably move along one or more depth adjustment guides secured at a location proximate the second end of the lower leg support assembly; and a depth selector configured to selectively and releasably secure the depth adjustment plate at a plurality of depth positions along the one or more depth adjustment guides, each of the plurality of depth positions corresponding to a different location along a depth axis parallel to a front-to-rear axis of the footplate base.

The shin support can further comprise: a first adjustment plate; a second adjustment plate; and an attachment device configured to selectively and releasably attach the first adjustment plate to the second adjustment plate. At least one of the first or second adjustment plates can comprise a height adjustment aperture and a width adjustment aperture plate. The height adjustment aperture can extend in a vertical direction that is perpendicular to the top surface of the footplate base. The width adjustment aperture can extend in a horizontal direction that is perpendicular to the vertical direction. When the attachment device is in a released configuration, a pin of the attachment device can be configured to slideably move along the height adjustment aperture and the width adjustment aperture to a plurality of height/width positions.

The lower leg support arm can comprise a plurality of apertures located within a portion of the lower leg support arm. The rotation selection device can comprise: a motion selection plate configured to slide along the portion of the lower leg support arm, the motion selection plate comprising one or more cutouts comprising a plurality of regions, each region configured to permit or restrict a different amount of rotation about the pivot point; a motion arm attached to the lower leg support arm, the motion arm comprising a motion pin configured to extend into the one or more cutouts; and a motion selector comprising a motion selector pin configured to selectively extend at least partially into the plurality of apertures.

When the motion selector pin is at least partially extended into a first aperture of the plurality of apertures, the motion pin can be aligned with a first region of the plurality of regions. When the motion selector pin is at least partially extended into a second aperture of the plurality of apertures, the motion pin can be aligned with a second region of the plurality of regions.

The plurality of regions can comprise at least two of: a first region configured to prevent rotation about the pivot point; a second region configured to permit rotation about the pivot point along a first predetermined angular distance corresponding to a dorsiflexion motion; a third region configured to permit rotation about the pivot point along a second predetermined angular distance corresponding to a plantarflexion motion; or a fourth region configured to permit rotation about the pivot point along a third predetermined angular distance corresponding to the dorsiflexion motion and the plantarflexion motion.

The plurality of regions can comprise at least three of: a first region configured to prevent rotation about the pivot point; a second region configured to permit rotation about the pivot point along a first predetermined angular distance corresponding to a dorsiflexion motion; a third region configured to permit rotation about the pivot point along a second predetermined angular distance corresponding to a plantarflexion motion; or a fourth region configured to permit rotation about the pivot point along a third predetermined angular distance corresponding to the dorsiflexion motion and the plantarflexion motion.

The articulating footplate apparatus can further comprise a strap assembly configured to detachably attach the foot of the user to the footplate base. The strap assembly can comprise: one or more straps, each strap comprising a first end and a second end; one or more tether portions extending from a heel support of the footplate base; and one or more attachment mechanisms configured to releasably and adjustably secure the one or more straps and the one or more tether portions.

The one or more straps can comprise a first strap extending underneath the top surface of the footplate base and having a first buckle portion located proximate the first end of the first strap and a first magnet located proximate the second end of the first strap. The one or more tether portions can include a first tether portion and a second tether portion. The first tether portion can comprise a second buckle portion configured to releasably attach to the first buckle portion. The second tether portion can comprise a second magnet complementary to the first magnet.

The second tether portion can further comprise a ratcheting device configured to selectively tighten or loosen the second tether portion.

The disclosed technology includes a gait training system comprising a first articulating footplate and a second articulating footplate. Each of the first and second articulating footplates can comprise: a footplate base comprising a top surface configured to support a foot of a user; a lower leg support assembly configured to extend along a portion of a leg of the user, the lower leg support assembly comprising: a first end and a second end opposite the first end; a footplate base connector located at the first end, the footplate base connector being attachable to the footplate base; and a pivoting mechanism comprising: a pivot point; and a rotation selection device configured to selectively permit rotation about the pivot point, the rotation selection device comprising a plurality of discrete rotation settings, each rotation setting being configured to permit rotation about the pivot point along a corresponding predetermined angular distance.

For each of the first and second articulating footplates: the lower leg support arm can comprise a plurality of apertures located within a portion of the lower leg support arm; and the rotation selection device can comprise: a motion selection plate configured to slide along the portion of the lower leg support arm, the motion selection plate comprising one or more cutouts comprising a plurality of regions, each region configured to permit or restrict a different amount of rotation about the pivot point; a motion arm attached to the lower leg support arm, the motion arm comprising a motion pin configured to extend into the one or more cutouts; and a motion selector comprising a motion selector pin configured to selectively extend at least partially into the plurality of apertures.

For each of the first and second articulating footplates: when the motion selector pin is at least partially extended into a first aperture of the plurality of apertures, the motion pin can be aligned with a first region of the plurality of regions, and when the motion selector pin is at least partially extended into a second aperture of the plurality of apertures, the motion pin can be aligned with a second region of the plurality of regions.

For each of the first and second articulating footplates, the plurality of regions can comprise at least two of: a first region configured to prevent rotation about the pivot point; a second region configured to permit rotation about the pivot point along a first predetermined angular distance corresponding to a dorsiflexion motion; a third region configured to permit rotation about the pivot point along a second predetermined angular distance corresponding to a plantarflexion motion; or a fourth region configured to permit rotation about the pivot point along a third predetermined angular distance corresponding to the dorsiflexion motion and the plantarflexion motion.

These and other aspects, features, and benefits of the claimed innovation(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements, and wherein.

DETAILED DESCRIPTION

Figure 1A:
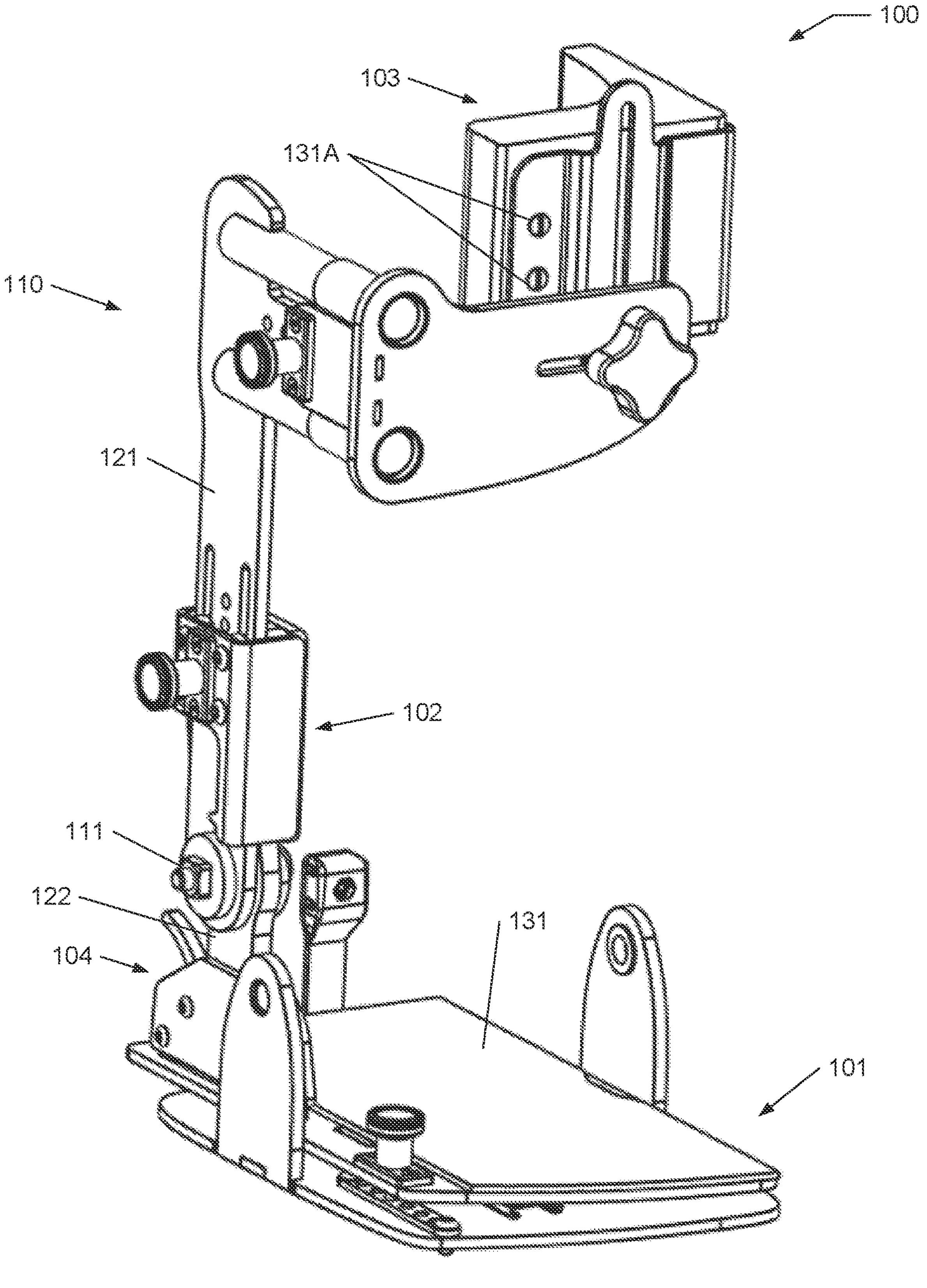
FIG. 1A illustrates a first perspective view of an articulating footplate, in accordance with the disclosed technology.

The disclosed technology relates generally to systems, methods, and apparatuses for isolating movements during gait training exercises and more specifically to an articulating footplate apparatus for isolating movements in the lower legs and feet. Some examples of the disclosed technology will be described more fully with reference to the accompanying drawings. However, this disclosed technology can be embodied in many different forms and should not be construed as limited to the implementations set forth herein. The components described hereinafter as making up various elements of the disclosed technology are intended to be illustrative and not restrictive. Indeed, it is to be understood that other examples are contemplated. Many suitable components that would perform the same or similar functions as components described herein are intended to be embraced within the scope of the disclosed apparatuses, systems, and methods. Such other components not described herein may include, but are not limited to, for example, components developed after development of the disclosed technology.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

In the following description, numerous specific details are set forth. But it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to and are not intended to imply that the objects so described should be in a given sequence, either temporally, spatially, in ranking, or in any other manner.

Prior to a detailed description of the disclosure, the following definitions are provided as an aid to understanding the subject matter and terminology of aspects of the present systems and methods. The following definitions are examples and are not necessarily limiting of the aspects of the systems and methods, which are expressed in the claims. Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Neutral position. A neutral position can be defined as a position where the foot is perpendicular to the lower leg. For example, the neutral position is common when a human stands without any inflexion in the ankle joint. The neutral position can be defined by a 90 degree angle between the foot and the lower leg.

Dorsiflexion motion. A dorsiflexion motion can be defined as a motion that induces a rotation of the foot about the ankle joint such that the foot is raised upwards towards the shin. For example, a dorsiflexion motion is performed when pulling the distal end of the foot (e.g., toes) towards the shin. The dorsiflexion motion can generate an angle less than 90 degrees (e.g., acute angle) between the foot and the lower leg.

Plantarflexion motion. A plantarflexion motion can be defined as a motion that induces a rotation of the foot about the ankle joint such that the foot is lowered away from the shin. For example, the plantarflexion motion is commonly performed when pointing the toes. The plantarflexion motion can generate an angle greater than 90 degrees (e.g., obtuse angle) between the foot and the lower leg.

Overview

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments and any further applications of the principles of the disclosure as illustrated therein are contemplated as would normally occur to one skilled in the art to which the disclosure relates. All limitations of scope should be determined in accordance with and as expressed in the claims.

Aspects of the present disclosure generally relate to systems and methods for promoting various types of movements performed by a user during gait training exercises. The disclosed system can aid localized movements performed by a lower leg and foot of the user. The lower leg can be defined as the portion of the leg below the knee joint and above the ankle joint. The disclosed system can include an articulating footplate. The articulating footplate can attach to a gait training machine. The gait training machine can be defined as a motorized system that can aid a user when performing full body training during rehabilitation procedures and gait training exercises. The gait training machine can isolate motions to train specific sequences of a gait cycle, provide various levels of aid to the user, and guide the user through repeated completions of the gait cycle. The gait cycle can be defined as the motion performed by a human when walking.

The gait training machine can include two articulating footplates for each leg of the user. The gait training machine can support the weight of the user as the user places each foot on each of the respective articulating footplates. The gait training machine can employ the motorized system to move the two articulating footplates, among other components, in a motion substantially similar to the gait cycle. For example, the gait training machine can push and/or pull each foot of the user to mimic a foot's normal motion during the gait cycle. Continuing this example, as the gait training machine pushes and pulls the feet of the user, the articulating footplate can support the leg of the user while allowing the user to perform motions common to the gait cycle. For example, the disclosed technology can include- or be included in-a gait training device, rehabilitation device, and/or locomotion training device such as those described in U.S. Non-Provisional patent application Ser. No. 17/875,038, filed Jul. 27, 2022. Accordingly, it should be understood that the disclosed includes a gait training machine, which can include one or more (e.g., two) articulating footplates, as described herein.

The articulating footplate can include a footplate base, a lower leg support arm, and a shin support. The articulating footplate can accept the foot of the user. For example, the user can place their foot on the footplate base. The articulating footplate can secure the foot and lower leg of the user using the footplate base and the shin support, respectively.

For example, the footplate base can include one or more straps to secure the foot of the user to the footplate base. Continuing this example, the shin support can confine the lower leg of the user in a particular position such that the lower leg can move freely but cannot move outside of the bounds of the shin support. The lower leg support arm can extend perpendicularly from the footplate base and can extend parallel to the lower leg of the user.

The articulating footplate can promote isolated movements of the lower leg and feet. For example, the articulating footplate can induce one or more distinct motions in the lower leg and feet. Continuing this example, each of the one or more distinct motions promoted by the articulating footplate can increase the freedom of movement of the lower leg and feet while reducing the articulating footplate's assistance to the user. A physical trainer and/or the user can vary between the one or more motions induced by the articulating footplate depending on the type of exercise performed by the user and/or the desired level of assistance provided by the articulating footplate.

The articulating footplate can include a pivoting mechanism to promote the one or more distinct motions performed by the articulating footplate. The pivoting mechanism can include a hinge and a motion selection plate. The hinge can form a connection between a footplate base connector and the lower leg support arm. The hinge can allow the foot of the user to perform a dorsiflexion motion and a plantarflexion about an ankle joint of the user. For example, the hinge can be located adjacent to the ankle joint and can allow the lower leg support arm to pivot relative to the footplate base to promote the dorsiflexion motion and/or the plantarflexion motion in the foot of the user.

The motion selection plate can restrict the motions performed by the foot relative to the ankle joint of the user. For example, the motion selection plate can include a first position. In the first position, the motion selection plate can fix the hinge such that the footplate base can be perpendicular to the lower leg support arm. In the first position, the foot of the user is constantly held in a neutral position. In the neutral position, the foot of the user can be constantly perpendicular to the lower leg of the user (e.g., the fibula). In another example, the motion selection plate can include a second position. In the second position, the motion selection plate can restrict the hinge such that the footplate base can only perform a plantarflexion motion. In yet another example, the motion selection plate can include a third position. In the third position, the motion selection plate can restrict the hinge such that the footplate base can only perform a dorsiflexion motion. In yet another example, the motion selection plate can include a fourth position. In the fourth position, the motion selection plate can allow the footplate base to freely rotate about the hinge to promote both the plantarflexion motion and the dorsiflexion motion.

Example Embodiments

Figure 1B:
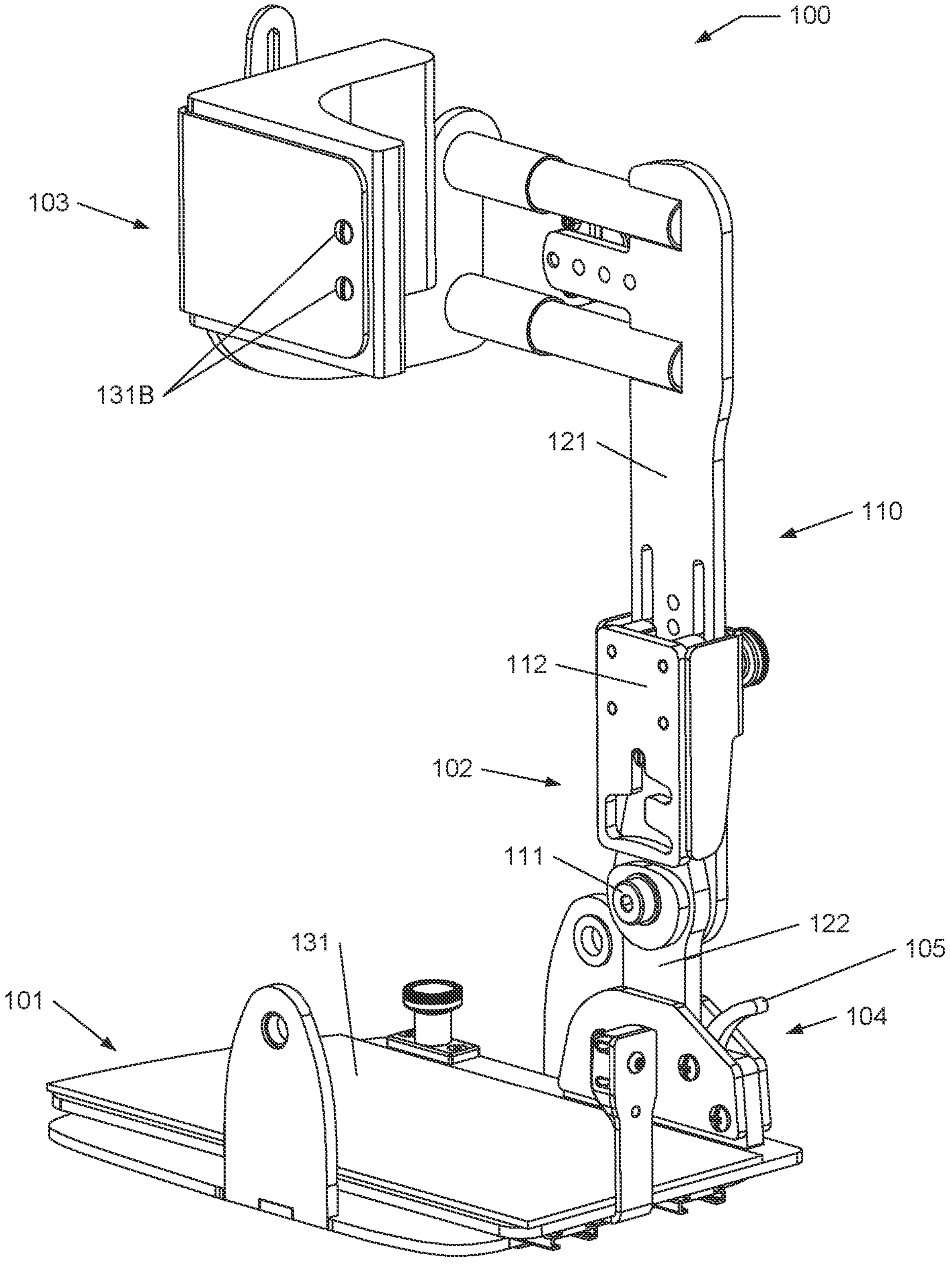
FIG. 1B illustrates a second perspective view of an articulating footplate, in accordance with the disclosed technology.

Referring now to the figures, for the purposes of example and explanation of the fundamental processes and components of the disclosed systems and processes, reference is made to FIG. 1, which illustrates an articulating footplate 100, according to one or more examples. As will be understood and appreciated, the articulating footplate 100 shown in FIG. 1 represents merely one approach or embodiment of the present system, and other aspects are used according to various embodiments of the present system.

Figure 10:
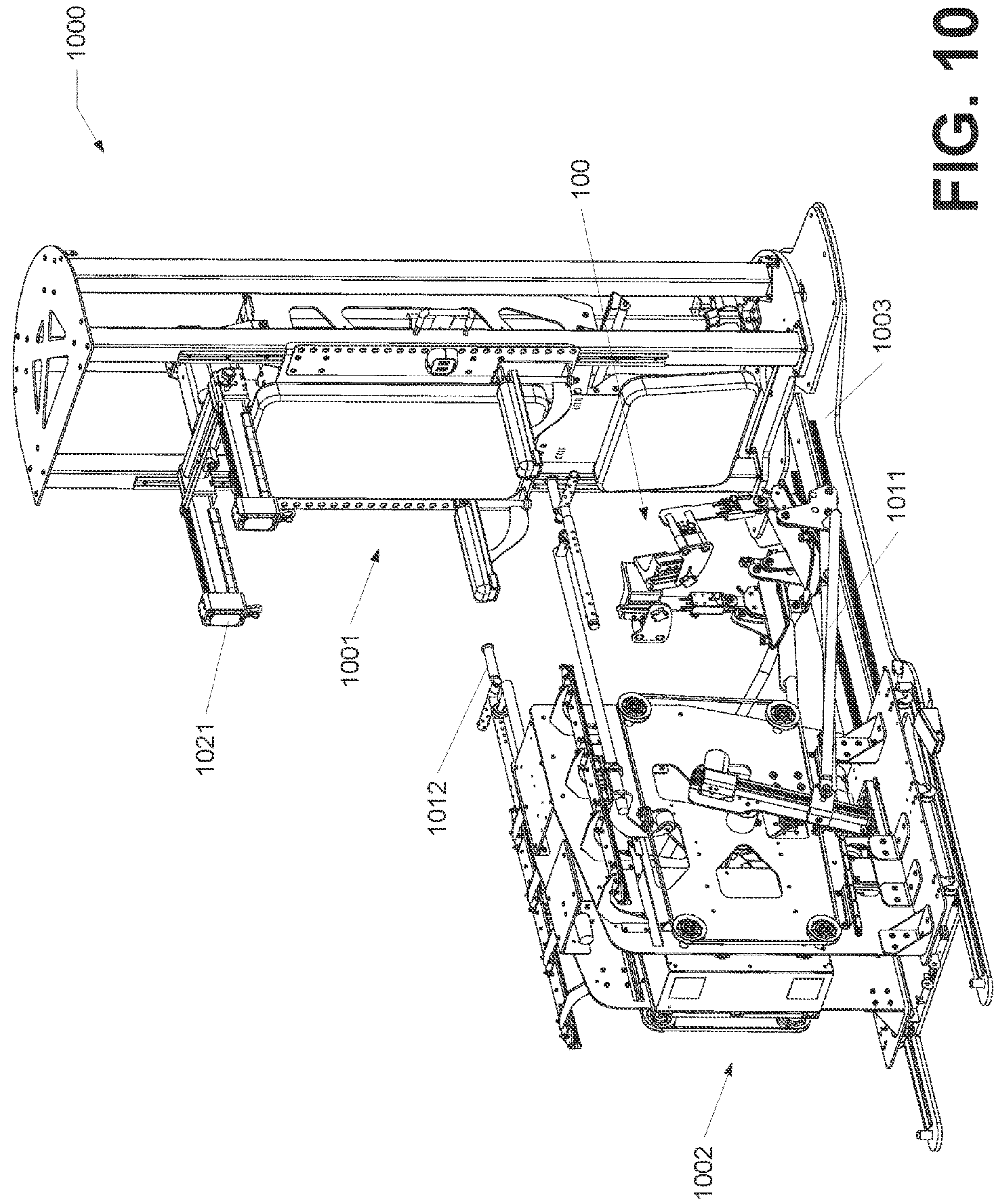
FIG. 10 illustrates a perspective view of an example gait training machine including articulating footplates, in accordance with the disclosed technology.

A gait training machine 1000, as illustrated in FIG. 10, can be used by physical therapists and other trained professionals to rehabilitate an individual (also referred to herein as a user and/or a patient) with an improper gait cycle. The gait cycle can be defined as a series of consecutive movements performed by humans that correspond with a proper walking motion. Improper gait cycles can be a side effect of an accident, disease, and/or any other life event that leads to physical impairment. The gait training machine 1000 can include a powered system and various articulating components. The power system and the various articulating components can receive and move the limbs of the patient to perform a proper gait cycle. For example, the patient with physical impairments can stand within the gait training machine 1000 and can be secured to the articulating components. Continuing this example, the gait training machine 1000 can move the patient's limbs and perform the series of consecutive movements that corresponds with the proper walking motion (e.g., proper gait cycle).

The various articulating components of the gait training machine 1000 can provide different levels of assistance to the user, isolate movements in specific body parts of the user, and articulate in accordance with the series of consecutive movements that define the proper gait cycle. For example, the articulating components can include the articulating footplate 100, among other components. The articulating footplate 100 can support a lower leg and corresponding foot of the user to promote motions that are common to, or necessary for, the proper walking motion. The lower leg can be defined as the body parts that extend from a knee joint to an ankle joint. The articulating footplate 100 can provide assistance to the user to promote proper rotation of the foot and/or lower leg about the ankle joint. The gait training machine 1000 can include one or more articulating footplates 100 for each leg and foot of the user. For example, the gait training machine 1000 can include two articulating footplates 100, one for each of the feet of the user.

The articulating footplate 100 can provide the lower leg and foot of the user with various points of stability and/or guide the user in one or more specified movements. The articulating footplate 100 can include a footplate base assembly 101 and a shin support assembly 110. Alternatively, the articulating footplate 100 can include a footplate base assembly 101 and no shin support assembly 110. As shown perhaps most clearly in FIG. 1C, the shin support assembly 110 can detachably attach to the footplate base assembly 101. The footplate base assembly 101 can provide a platform for receiving and supporting a foot of the user. For example, the user can place their foot on the footplate base assembly 101 such that the sole of the foot is touching a top surface 131 of the footplate base assembly 101. The footplate base assembly 101 can include one or more straps (not shown) and/or any other securing mechanism for fixing the foot of the user onto the footplate base assembly 101. For example, the footplate base assembly 101 can include a clipping mechanism (not shown). Alternatively or in addition, a shoe of the user can include a clipping receptacle such that the user can clip their shoes to the footplate base assembly 101 by connecting the clipping receptacle to the clipping mechanism. As a more specific example, the shoe or other footwear wearable by the user can include one or more female clip components, and the footplate base assembly 101 can include one or more corresponding male clip components configured to detachably attach to each female clip components (or an alternative configuration in which the male component(s) are located on the footwear and the female component(s) are located on the footplate base assembly 101) Alternatively or in addition, the top surface 131 can include a high friction material that can secure the foot of the user to the footplate base assembly 101 by applying friction to a sole of the foot.

The shin support assembly 110 can help guide the user's leg in one or more specified movements relative to the footplate base assembly 101 and/or relative to the user's foot, and/or the shin support assembly 110 can help stabilize the user's leg in or more specified positions relative to the footplate base assembly 101 and/or relative to the user's foot. The shin support assembly 110 can include a shin support portion 103 confine the shin and the lower leg within a particular region. Alternatively or in addition, the shin support portion 103 can be attached to the shin or lower leg of the user (e.g., via a strap). For example, the shin support portion 103 can allow the lower leg to move within the particular region to perform movements that are in accordance with the gait cycle. Continuing this example, the shin support portion 103 can confine the lower leg from moving outside of the particular region and performing movements that are not in accordance with the gait cycle. Accordingly, the shin support assembly 110 can provide support to the lower leg of the user. For example, the user can rest their leg against a cushion 201 (see, e.g., FIGS. 2A and 2B) or other contact surface for support during a gait training exercise. Alternatively or in addition, the shin support portion 103 can include a leg strap or other restraining device that can, for example, wrap around the lower leg and secure the lower leg to the shin support portion 103. The leg strap can have a first strap portion attached to the leg support assembly at leg strap apertures 131A and a second strap portion attached to the leg support assembly 110 at leg strap apertures 131B. The leg strap can be or include any useful strap type or material and can include a clasping mechanism configured to detachably attach the first and second strap portion (e.g., a side squeeze buckle).

The shin support assembly 110 can include a lower leg support arm 121 that is hingedly connected to a footplate base connector 122. The footplate base connector 122 can be configured to detachably attach to the footplate base assembly 101 as discussed further herein. The lower leg support arm 121 can be configured to rotate relative the footplate base connector 122 (and the footplate base assembly 101) about the hinge 111. The footplate base connector 122 can extend generally perpendicularly from the footplate base assembly 101 (e.g., generally normal to the top surface 131 of the footplate base assembly 101). Thus, when the lower leg support arm 121 is in an upright position (e.g., the lower leg support arm 121 and the footplate base connector 122 are generally parallel), the lower leg support arm 121 can extend in a generally upright configuration relative (e.g., generally perpendicular) to the footplate base assembly 101. When the user is positioned onto the articulating footplate 100, the lower leg support arm 121 can extend generally parallel to the lower leg of the user. For example, the lower leg support arm 121 can run generally parallel, and proximally, to a lateral portion of the user's leg (e.g., the outside of the leg).

The shin support portion 103 can be connected to the lower leg support arm 121. As illustrated, the shin support portion 103 can be connected to the end of the lower leg support arm 121 that is opposite the footplate base connector 122. The lower leg support arm 121 can position the shin support portion 103 below the knee joint of the user.

Although not depicted in the figures, the lower leg support arm 121 can be configured to adjust to different lengths. In such a configuration, the lower leg support arm 121 can be configured to change lengths (e.g., to more easily support users of different heights). For example, the lower leg support arm 121 can comprise two or more sections that can be slideably engaged. As a more specific example, adjacent sections of the lower leg support arm 121 can be in mechanical communication via a releasable securing assembly, such as a pin (e.g., clevis pin and/or cotter pin) and multiple apertures extending through at least one of the adjacent sections (e.g., one adjacent section can include a single aperture and the other adjacent section can include multiple apertures).

The shin support assembly 110 can include a pivoting mechanism 102. The pivoting mechanism 102 can include a hinge 111 and a motion selection plate 112. The hinge 111 can form a rotational connection between the lower leg support arm 121 and the footplate base connector 122. The footplate base connector 122 can insert into a locking mechanism 104 of the footplate base connector 122. The locking mechanism 104 can include an aperture or slot configured to receive at least a portion of the footplate base connector 122 and a locking device, as described more fully herein. The locking mechanism 104 can be configured to secure the footplate base connector 122 of the shin support assembly 110 to the footplate base assembly 101. By securing the footplate base connector 122 within, or otherwise to, the locking mechanism 104, the lower leg support arm 121 can attach to the footplate base assembly 101 by extension by way of the footplate base connector 122 and the hinge 111.

The hinge 111 can allow the lower leg support arm 121 to pivot about the footplate base assembly 101, or vice versa. For example, the footplate base assembly 101 and/or the lower leg support arm 121 can pivot about the hinge 111. The footplate base assembly 101 and/or the lower leg support arm 121 can pivot about the hinge 111 such that users can perform a dorsiflexion motion and/or a plantarflexion motion. For example, the footplate base assembly 101 can rotate in a counterclockwise direction relative to the hinge 111 (when viewed from the outside of a right leg version of articulating footplate 100 (e.g., from the left side of the view shown in FIG. 1A)) to promote a dorsiflexion motion in the foot of the user, and/or the footplate base can rotate in a clockwise direction relative to the hinge 111 (when viewed from the outside of a right leg version of articulating footplate 100 (e.g., from the left side of the view shown in FIG. 1A)) to promote a plantarflexion motion. The lower leg support arm 121 can rotate in a clockwise direction relative to the hinge 111 to promote the dorsiflexion motion, and/or the lower leg support arm 121 can rotate in a counterclockwise direction relative to the hinge 111 to promote the plantarflexion motion.

The motion selection plate 112 can allow the footplate base assembly 101 to perform different motions, as described more fully herein. The motion selection plate 112 can include multiple settings or positions that can permit or prevent different movements of a user. The motion selection plate 112 can be placed in a first position that can restrict the footplate base assembly 101 such that the footplate base assembly 101 cannot rotate about the hinge 111. More specifically, the first position can correspond to a static configuration in which the shin support assembly 110 extends in a direction that is generally perpendicular to the top surface 131 of the footplate base assembly 101. The footplate base assembly 101 can maintain the foot of the user in a neutral position while the motion selection plate 112 is in the first position.

The motion selection plate 112 can be placed in a second position that can at least partially restrict movement of the footplate base assembly 101 such that the footplate base assembly 101 can be moved only through plantarflexion motions. The motion selection plate 112 can be placed in a third position that can at least partially restrict movement of the footplate base assembly 101 such that the footplate base assembly 101 can be moved only through dorsiflexion motions. The motion selection plate 112 can be placed in a fourth position that can allow the footplate base assembly 101 to be moved only through both the plantarflexion motions and the dorsiflexion motions. As will be understood by those having skill in the art, the motion selection plate 112 can include one, some, or all of the aforementioned settings or positions, and/or the motion selection plate 112 can include one or more settings or positions not expressly described herein. Regardless, each setting or position of the motion selection plate 112 can serve to selectively restrict or permit a predetermined range of motion about the hinge (e.g., can permit the lower leg support arm 121 to travel a predetermined angular distance and/or arc length).

Figure 1C:
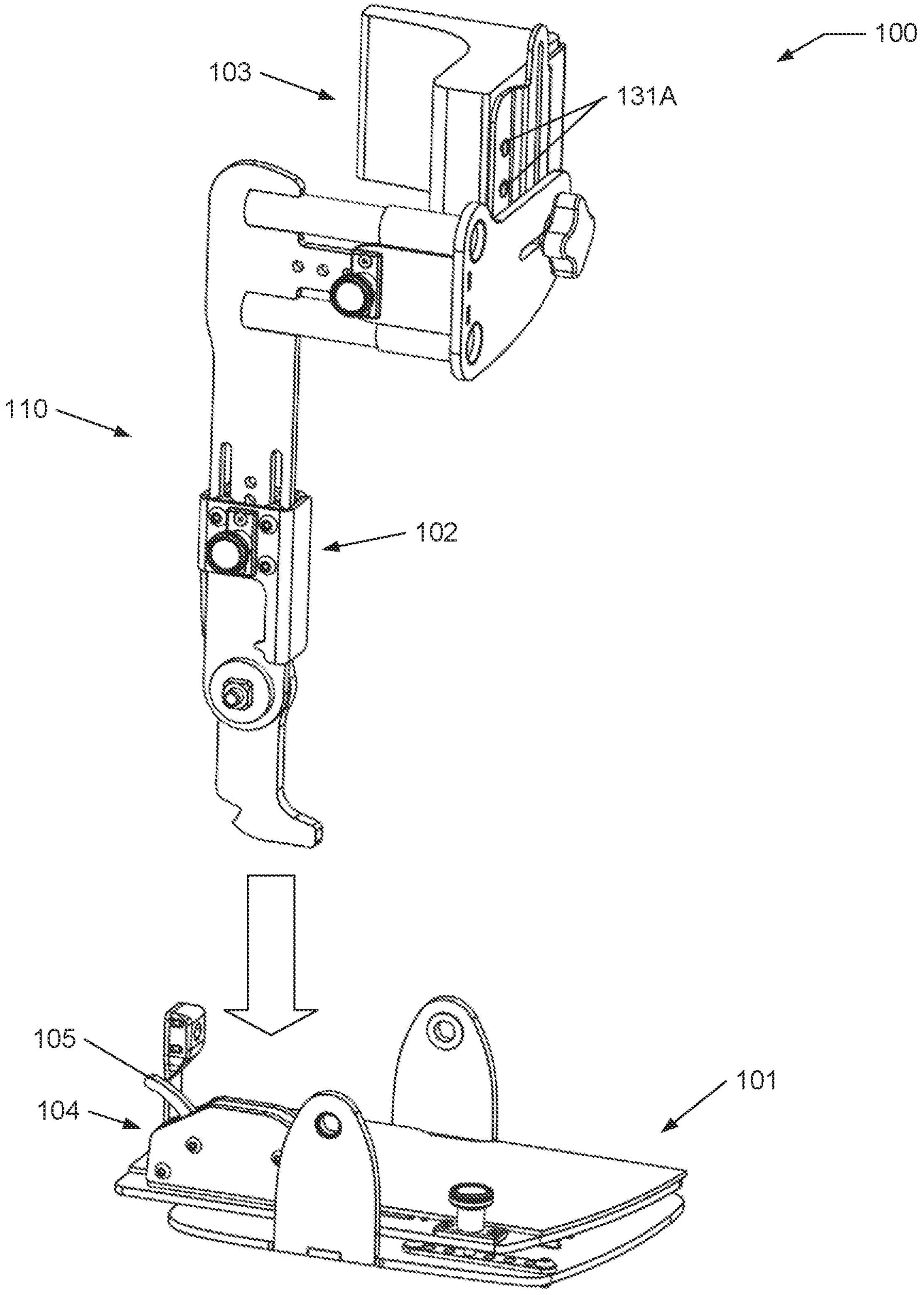
FIG. 1C illustrates a perspective view of an articulating footplate in a detached configuration, in accordance with the disclosed technology.

The locking mechanism 104 can fix the footplate base connector 122 to the footplate base assembly 101. The locking mechanism 104 can be in a locked position and an unlocked position. In the locked position, the locking mechanism 104 can secure the footplate base connector 122 within the locking mechanism 104. In the unlocked position, the locking mechanism 104 can release the footplate base connector 122 such that both the lower leg base arm 121 and the footplate base connector 122 can detach from the locking mechanism 104. In the unlocked position, the lower leg support arm 121, the footplate base connector 122, and the shin support portion 103 can be removed from the articulating footplate 100 (e.g., as shown in FIG. 1C). The lower leg support arm 121, the footplate base connector 122, and the shin support portion 103 can be removed from the articulating footplate 100 to reduce assistance provided to the user and increase the difficulty of the gait training exercise, as a non-limiting example. For example, the footplate base assembly 101 can function without the lower leg support arm 121 and the shin support assembly 110.

Figure 2A:
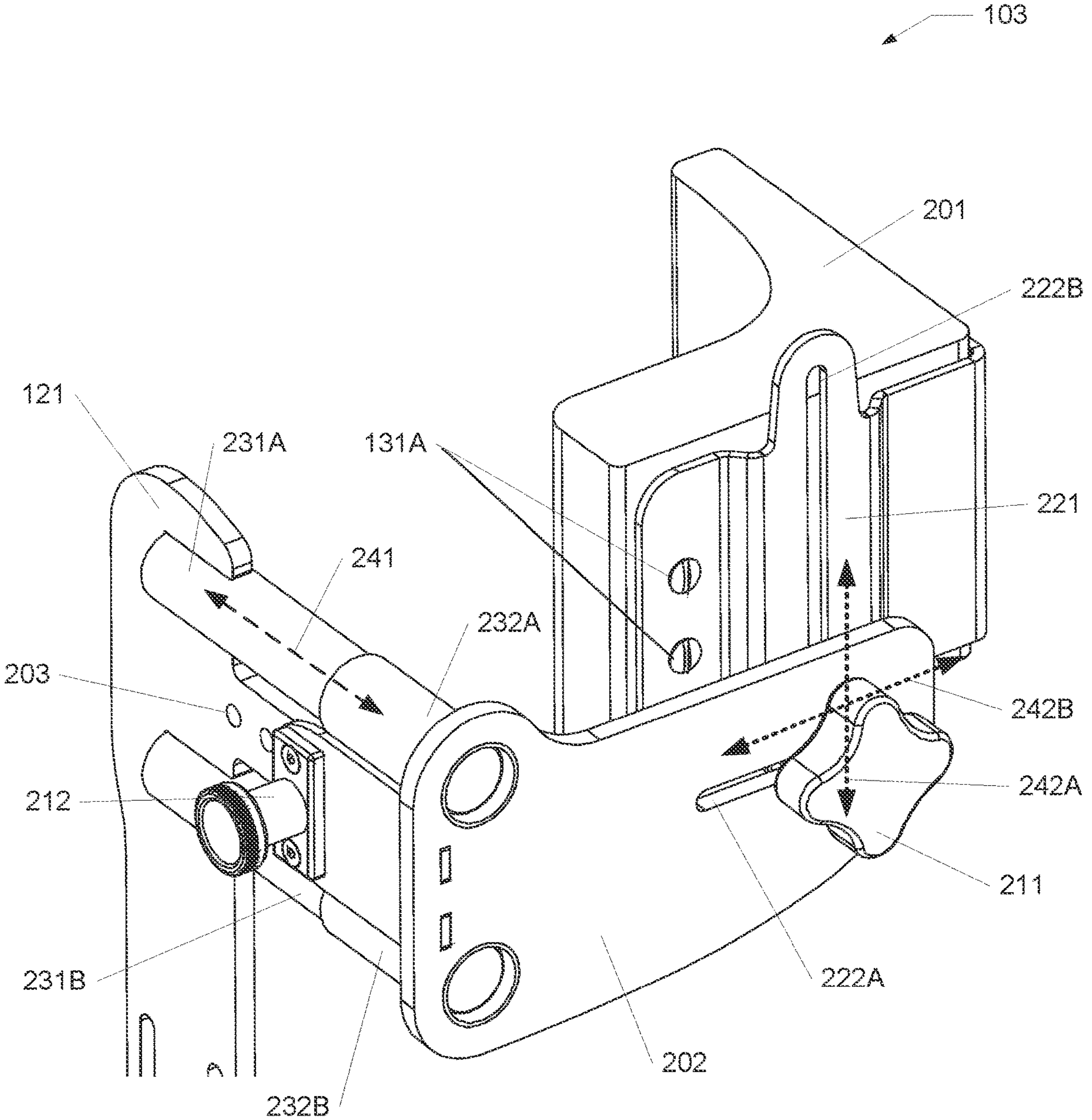
FIG. 2A illustrates a perspective view of a shin support of an articulating footplate, in accordance with the disclosed technology.
Figure 2B:
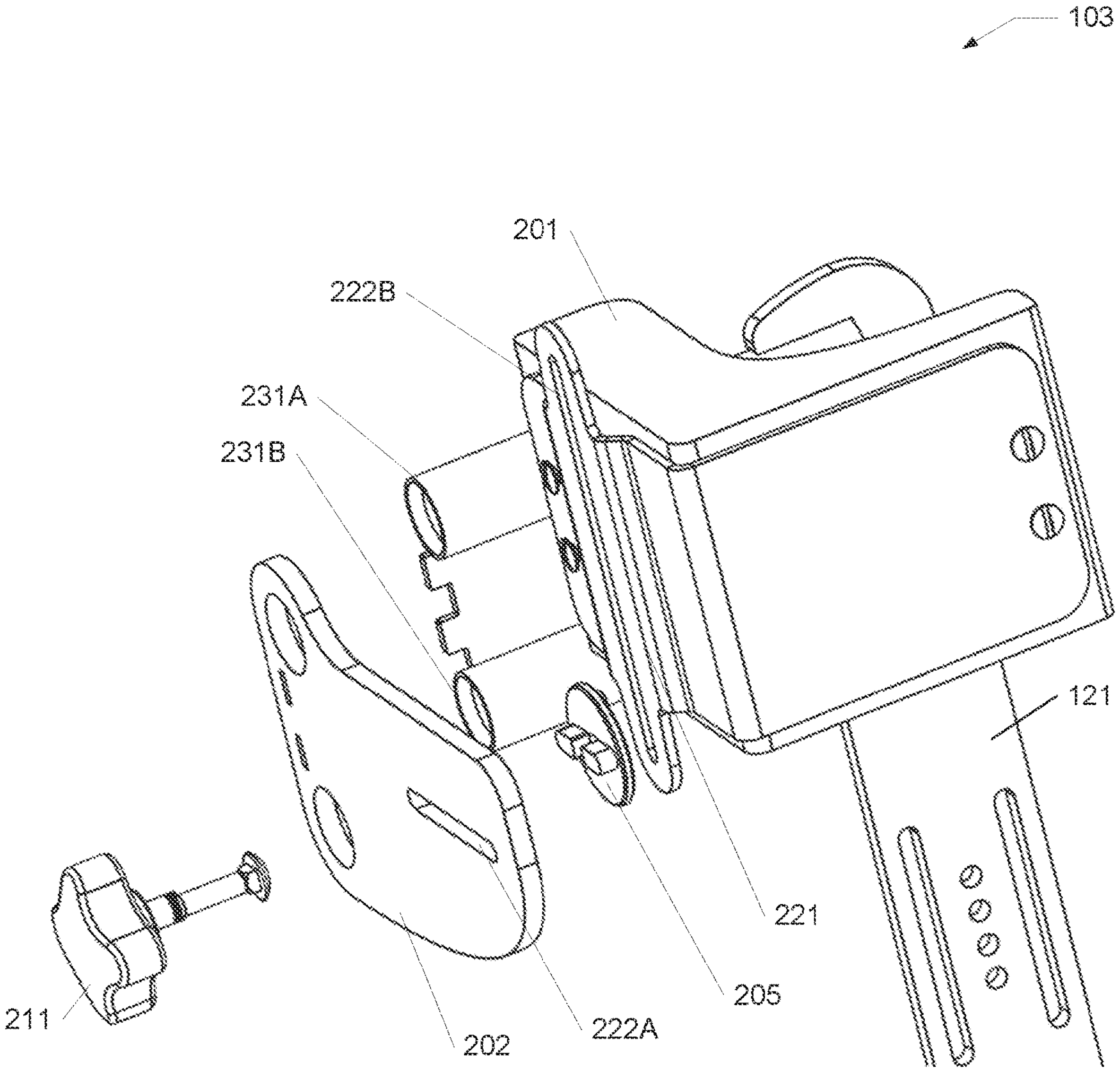
FIG. 2B illustrates a partial exploded view of a shin support of an articulating footplate, in accordance with the disclosed technology.

Referring now to FIGS. 2A and 2B, an example shin support portion 103 is shown, according to the disclosed technology. The shin support assembly 110 can provide support to the user when performing gait training exercises. For example, the user can rest their shin against the cushion 201 for support during particular exercises, and/or the shin support assembly 110 can provide resistance against a user's leg to help facilitate movement of the user's foot leg in a specified movement pattern. As another example, the shin support assembly 110 can include a leg strap such that a user can secure their leg against the cushion 201 (and/or another portion of the shin support assembly 110). Such a leg strap can be attached to the shin support assembly 110, at any useful location. For example, the leg strap can attach to the height adjustment plate 221 (which is described more fully herein), via leg strap attachment apertures 131A and/or 131B.

The shin support assembly 110 can include the cushion 201 and/or a depth adjustment mechanism, which can include a depth adjustment plate 202 and one or more depth adjustment apertures 203, as non-limiting examples. The depth adjustment mechanism can include a depth adjustment plate 202, which can be configured to slideably move along one or more depth adjustment guides (e.g., shown as tubes in FIG. 2). The depth adjustment plate 202 can include one or more ports 232A-232B. The one or more ports 232A-232B can receive one or more attachment points 231A-231B extending from the lower leg support arm 121. The attachment points 231A-231B can insert into the ports 232A-232B such that the depth adjustment plate 202 can secure to the lower leg support arm 121. The depth adjustment plate 202 can slide along the attachment points 231A-231B. For example, the ports 232A-232B can slide along the attachment points 231A-231B along a bidirectional axis 241 (e.g., forward direction and rearward direction with respect to the perspective of a user standing on the articulating footplate 100).

The depth adjustment plate 202 can include a depth selector 212. The depth selector 212 can removeably affix the depth adjustment plate 202 to the lower leg support arm 121. The depth selector 212 can be or include an adjustable pin that can secure the depth adjustment plate 202 to the lower leg support arm 121, such as by inserting into the one or more depth adjustment apertures 203. For example, the depth selector 212 can insert into any of the depth adjustment apertures 203 to limit the movement of the depth adjustment plate 202 along the bidirectional axis 241. The lower leg support arm 121 can include more than one depth adjustment aperture 203 such that the cushion 201 can be affixed at various depths. The depth selector 212 can be replaced with one or more teeth located on the surface of the attachment points 231A-231B and one or more hooks on or within the ports 232A-232B. The one or more hooks of the ports 232A-232B can anchor to the one or more teeth of the attachment points 231A-231B to secure the depth adjustment plate 202 to the lower leg support arm 121. The one or more hooks of the ports 232A-232B can be adjusted such that the depth adjustment plate 202 can travel along the bidirectional axis 241 and subsequently anchor to the teeth of the attachment points 231A-231B at various depths.

The shin support portion 103 can include a height adjustment aperture 222B (e.g., a vertical slot), a width adjustment aperture 222A (e.g., a horizontal slot), and/or a height and width adjustment pin 211. The cushion 201 can be attached to, or otherwise connected to, the height adjustment plate 221. The height and width adjustment pin can extend through the width adjustment aperture 222A and the height adjustment plate 221. For example, the width adjustment aperture 222A can be located within the depth adjustment plate 202. Continuing this example, the height and width adjustment pin 211 can extend through the depth adjustment plate 202 along the width adjustment aperture 222A. Further continuing this example, the height and width adjustment pin 211 can extend through the height adjustment plate 221 along a height adjustment aperture 222B (e.g., a vertical slot) while simultaneously extending through the depth adjustment plate 202 along the width adjustment aperture 222A.

The height and width adjustment pin 211 can secure the cushion 201 at a particular height and/or a particular width. The height and width adjustment pin 211 can be in a locked configuration and an unlocked configuration. In the locked configuration, the cushion 201 is secured at the particular height and the particular width along a vertical axis 242A and a horizontal 242B. Alternatively, a single plate (e.g., either the depth adjustment plate 202 or height adjustment plate 221) can include both height adjustment plate 221 and the width adjustment aperture 222A (e.g., to create a "crosshair" or "plus sign" configuration). In the unlocked configuration, the height and width adjustment pin 211 can move freely within the width adjustment aperture 222A and the height adjustment aperture 222B. For example, the height and with adjustment pin 211 can include a screw and an anchor nut. Continuing this example, the anchor nut can move freely but permanently reside within the height adjustment plate 221 such that the screw of the height and width adjustment pin 211 can secure to the anchor nut at any location along the height adjustment aperture 222B. By allowing the height and width adjustment pin 211 to move freely within the width adjustment aperture 222A and the height adjustment aperture 222B, the cushion 201 can be fixed at any position along a plane defined by the vertical axis 242A and the horizontal axis 242B.

As shown perhaps most clearly in FIG. 2B, the shin support portion 103 can include a guide 205 that can interface with the width adjustment aperture 222A and/or height adjustment aperture 222B. As such, the guide 205 can help maintain the shin support portion 103 in a vertical configuration (e.g., generally parallel to the user's leg when the leg is attached to the footplate base assembly 101). As illustrated in FIG. 2B, the guide 205 can include a protrusion configured to insert into the width adjustment aperture 222A. This can maintain a general perpendicular configuration between the width adjustment aperture 222A and the height adjustment aperture 222B. The guide 205 can be configured to be positioned between the depth adjustment plate 202 and the height adjustment plate 221 and can include an aperture extending therethrough to permit the height and width adjustment pin 211 to extend therethrough.

The particular region can define an area where the shin, knee joint, and/or lower leg of the user is confined to when using the shin support portion 103. The particular region can be located between the cushion 201 and the lower leg support arm 121.

Figure 3A:
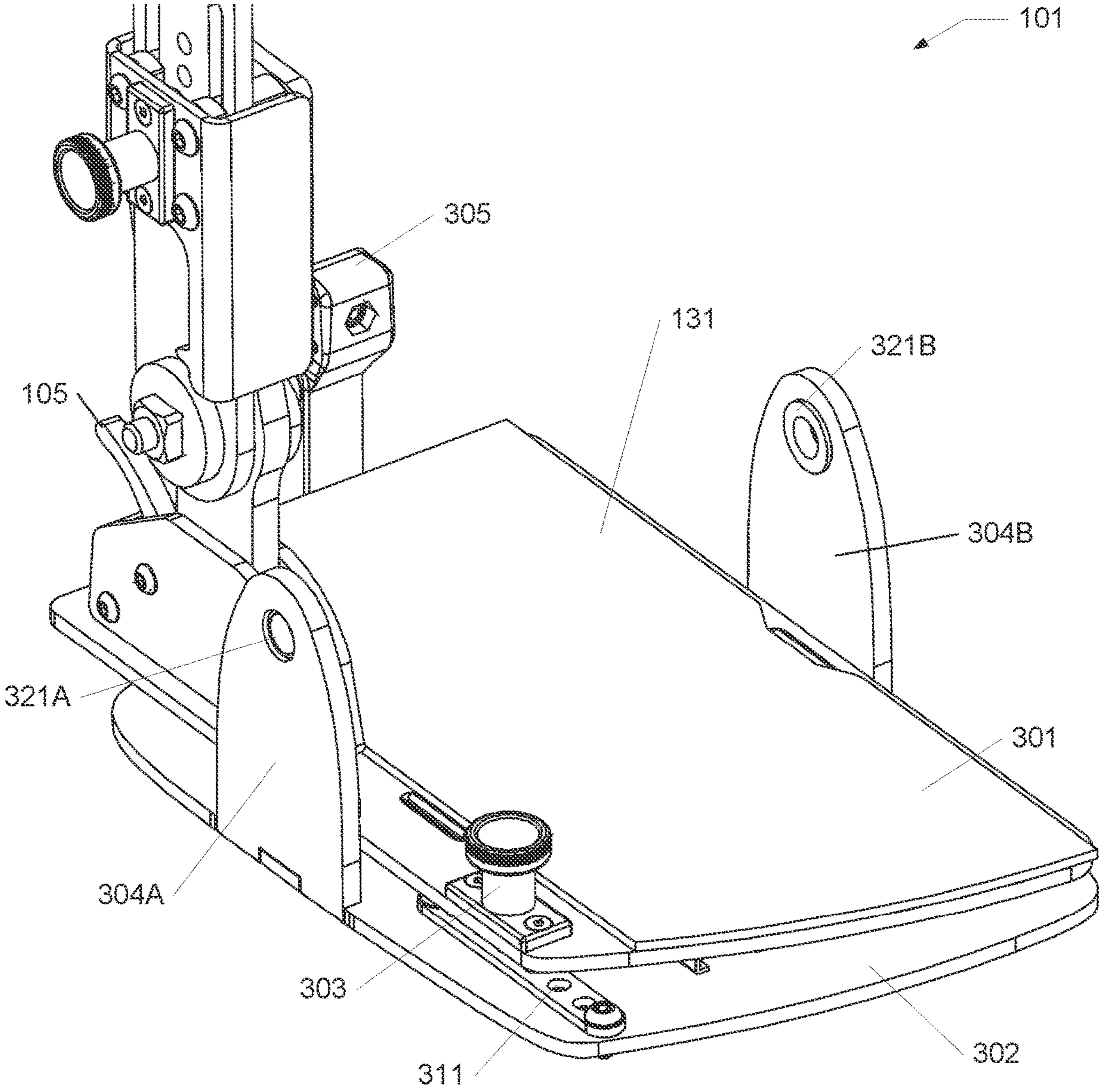
FIG. 3A illustrates a perspective view of a footplate base of an articulating footplate, in accordance with the disclosed technology.
Figure 3B:
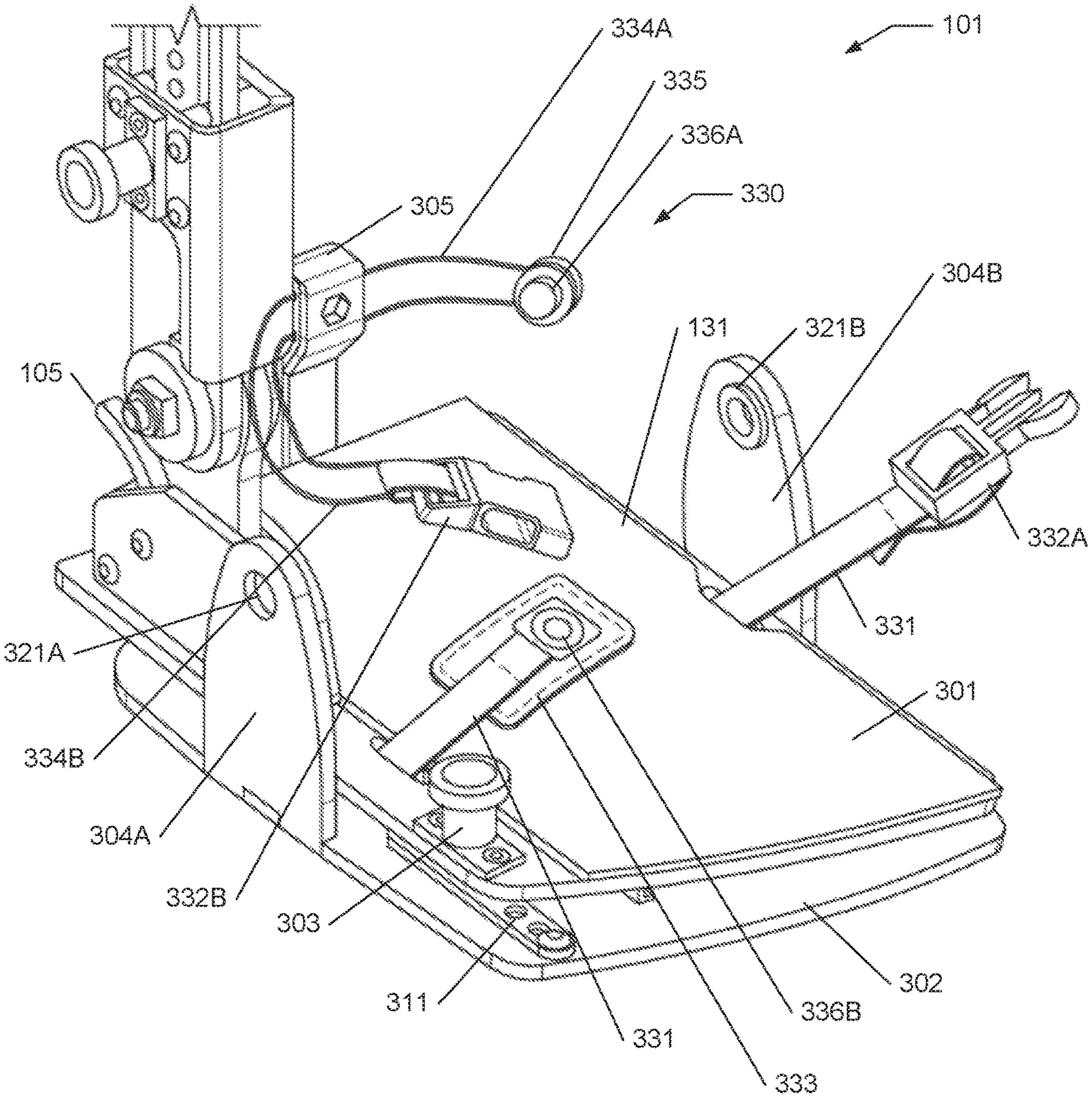
FIG. 3B illustrates a perspective view of a footplate base of an articulating footplate including foot attachment straps, in accordance with the disclosed technology.
Figure 3C:
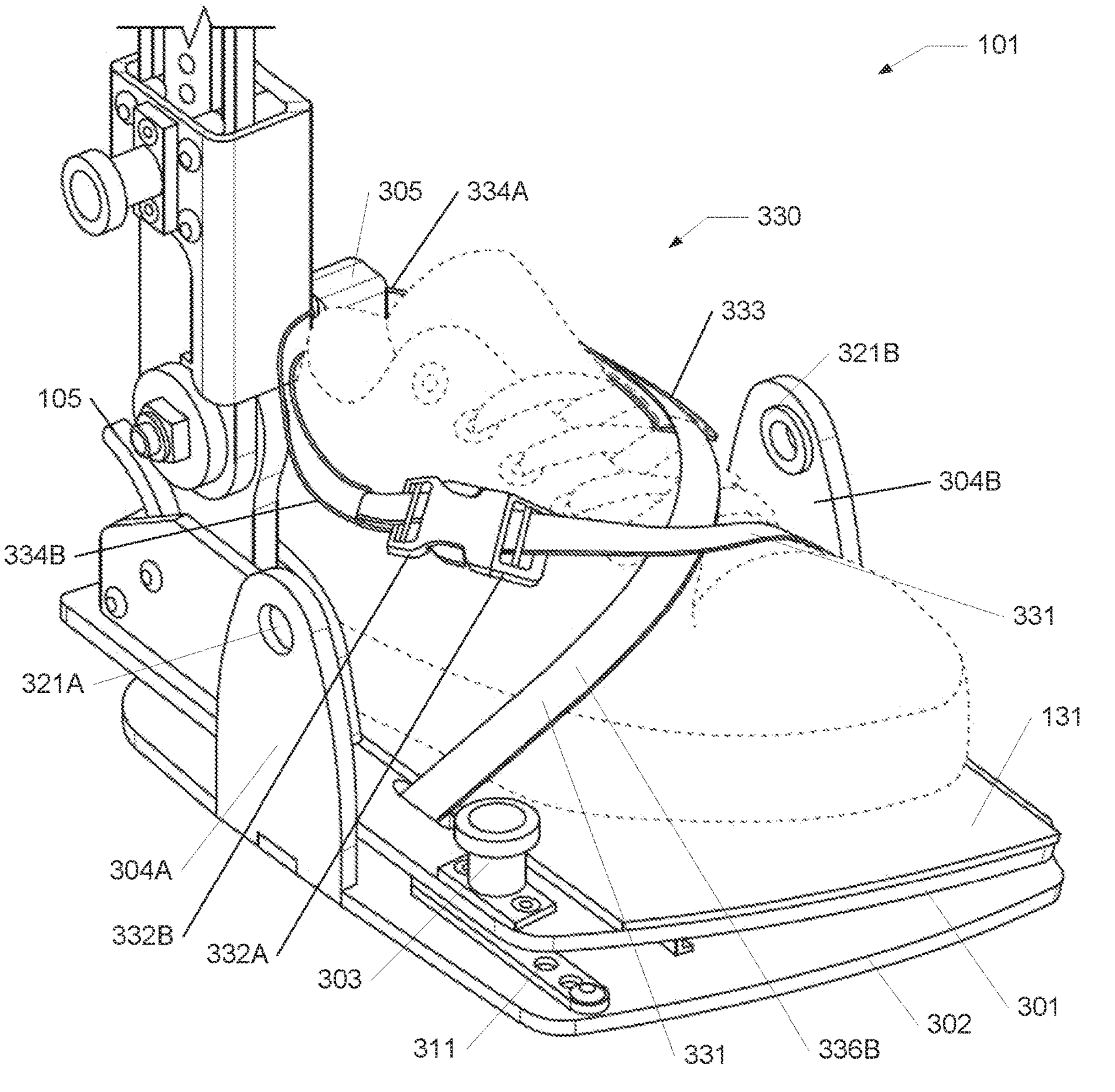
FIG. 3C illustrates a perspective view of a footplate base of an articulating footplate attached to a shoe via foot attachment straps, in accordance with the disclosed technology.

Referring now to FIGS. 3A-3B, the footplate base assembly 101, in accordance with the disclosed technology, is described more fully. The footplate base assembly 101 can receive the foot of the user. For example, the footplate base assembly 101 can include the top surface 131. The user can place their foot on the top surface 131 of the footplate base assembly 101, and the footplate base assembly 101 can be secured to the user's foot using any particular attachment mechanism (e.g., a strap assembly 330). Referring in particular to FIGS. 3B and 3C, the strap assembly 330 can include one or more straps, cords, or other tether-like structures or components and one or more fasteners to detachably attach the user's foot to the footplate base assembly 101. The one or more fasteners can be configured to selectively tighten and/or selectively release to adjust the tightness of the strap and thereby adjust how securely the user's foot is attached to the footplate base assembly 101. The strap assembly can include a strap 331. As illustrated, the strap 331 can pass under the top surface 301 of the footplate base assembly 101 and can have a first end and a second end (e.g., to secure the user's foot in the vertical direction). As an example, the first and second ends of the strap 331 can include complementary clasps or buckles to connect the first and second ends and thereby form a loop.

Alternatively, the ends of the strap 331 can be configured to attach to other components, as illustrated, for example. As a non-limiting example, the first end of the strap 331 can include a first buckle portion 332A, and the second end of the strap 331 can include a pad 333 (e.g., configured to prevent the strap 331 from digging into the user's foot).

The strap assembly 330 can further include a first tether portion 334A and a second tether portion 334B. The first and second tether portions 334A, 334B can be connected to the heel support 305 (which will be described more fully herein). The free end of the first tether portion 334A can include a ratcheting tightening device 335, and the ratchet tightening device 335 can be configured to detachably attach to the second end of the strap 331. For example, the ratcheting tightening device 335 can include a magnet 336B, and the second end of the strap can include a complementary magnet 336B. Accordingly, the magnets 336A, 336B can detachably attach the ratcheting device 335. The ratcheting device 335 can be rotated in a first direction to tighten the user's foot against the heel support 305 (e.g., to secure the user's foot in the horizontal direction). The ratcheting device 335 can be rotated in a second opposite direction and/or otherwise released to loosen the user's foot against the heel support 305. Any other type of connector-such as various clasps, buckles, hook and loop connectors, and the like—can be used.

The free end of the second tether portion 334B can include a second buckle portion 332B that can be configured to detachably attach, or otherwise connect, to the first buckle portion 332A. The strap can be tightened (e.g., by pulling a free end of the strap 331 through the first buckle portion 332A.

As shown in FIG. 3C, the second end of the strap 331 (e.g., the end including the pad 333) can be connected to the first tether portion 334A (e.g., via the magnet 336A of the ratcheting tightening device 335 and the magnet 336B of the pad 333). The first end of the strap 331 (e.g., the end including the first buckle portion 332A) can extend over the user's foot (e.g., and also over the second end of the strap 331) and can be connected to the second tether portion 334B via the first and second buckle portions 332A, 332B. The strap assembly 330 can be selectively tightened and/or loosened via at least one tightening/loosening mechanism, such as the strap/buckle (e.g., strap 331 and/or the first and second buckle portions 332A, 332B) and/or the ratcheting tightening device 335.

The footplate base assembly 101 can include an upper portion 301, a lower portion 302, an alignment selector 303, one or more attachment points 304A-304B, and a heel support 305. The upper portion 301 can receive the foot of the user. The lower portion 302 can connect to the upper portion 301 through an undermount slide. An undermount slide can include a ball-bearing system, for example, which can allow the upper portion 301 to move relative to the lower portion 302. The footplate base assembly 101 can use any particular adjustable connection between the upper portion 301 and the lower portion 302. The upper portion 301 can be repositioned such that the foot is in a proper location for performing plantarflexion and dorsiflexion motions. For example, the location where the foot rotates about the lower leg can vary based on the foot size of the user. Continuing this example, the upper portion 301 can be repositioned relative to the lower portion 302 such that the foot is in the proper location to perform plantarflexion and dorsiflexion motions.

The placement of the upper portion 301 relative to the lower portion 302 can be varied using the alignment selector 303 and one or more alignment apertures 311. The alignment selector 303 can include a pin and spring system that can insert into one or more alignment apertures 311. The alignment apertures 311 can attach to the lower portion 302. The alignment apertures 311 can be integrated as a series of apertures within the lower portion 302. For example, the alignment apertures 311 can extend through the lower portion 302 (e.g., be integrated into the lower portion 302) rather than being a separate component attached to the lower portion 302. The pin and spring system of the alignment selector 303 can insert into the alignment apertures 311 to fix the location of the upper portion 301 relative to the lower portion 301 (e.g., the undermount slide is locked from movement). The user can adjust the upper portion 301 by pulling on the alignment selector 303 and freeing the pin and spring system from the alignment aperture 311. Once the pin and spring system is freed from the alignment apertures 311, the upper portion 301 can move along the undermount slides relative to the lower portion 302. Once in the desired position, the alignment selector 303 can be released into the selected alignment aperture 311 such that the upper portion 301 is fixed relative to the lower portion 302.

The heel support 305 can apply resistance and stability to the heel during gait training exercises. For example, the user can press their heel into the heel support 305 to provide the user with stability when performing the gait training exercises. The heel support 305 can be removable from the footplate base assembly 101. For example, if the user wishes for less support and more difficult gait training exercises, the heel support 305 can be removed.

The Attachment points 304A-304B can receive attachment arms 1011 extending from the gait training machine 1000 (see FIG. 10 for further details). For example, the attachment points 304A-304B can include one or more attachment ports 321A-B. The attachment arms 1011 of the gait training machine 1000 can attach to the attachment points 304A-304B through the attachment ports 321A-B. The attachment arms 1011 can connect to a motorized system (e.g., a sled 1002 as discussed in FIG. 10) at a first end and the attachment points 304A-304B at a second end to induce movement into the footplate base assembly 101.

Figure 4:
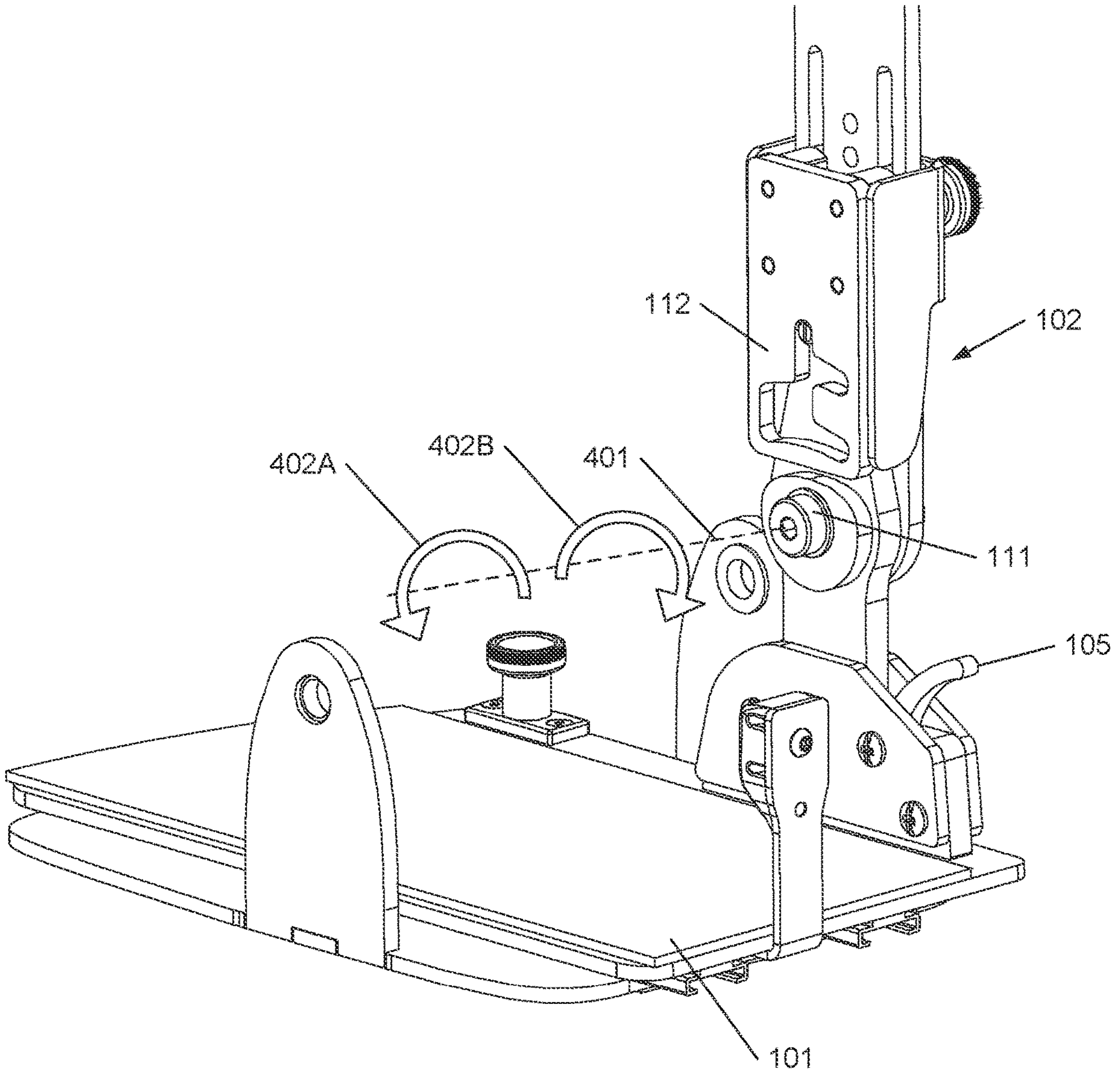
FIG. 4 illustrates a perspective view of the footplate base and a pivoting mechanism, in accordance with the disclosed technology.

Referring now to FIG. 4, illustrated is a perspective view of the footplate base assembly 101 and the pivoting mechanism 102, according to the disclosed technology. The footplate base assembly 101 and/or the lower leg support arm 121 can rotate about a hinge axis 401. The hinge axis 401 can be centered at the hinge 111 and can extend generally perpendicularly to the longitudinal axis of the shin support assembly 110 and/or in a generally left-right direction from the user's perspective when the user's foot is attached to the footplate base assembly 101. The footplate base assembly 101 can rotate in a first rotational direction 402A and a second rotational direction 402B that is opposite the first rotational direction 402A. It should be noted that, throughout this disclosure, the pivoting action can be interchangeably referenced as the footplate base assembly 101 pivoting relative to the lower leg support arm 121 or as the lower leg support arm 121 pivoting relative to the footplate base assembly 101. In either instance, it should be understood that reference is being made to a pivoting action occurring between the footplate base assembly 101 and the lower leg support arm 121.

Figure 5:
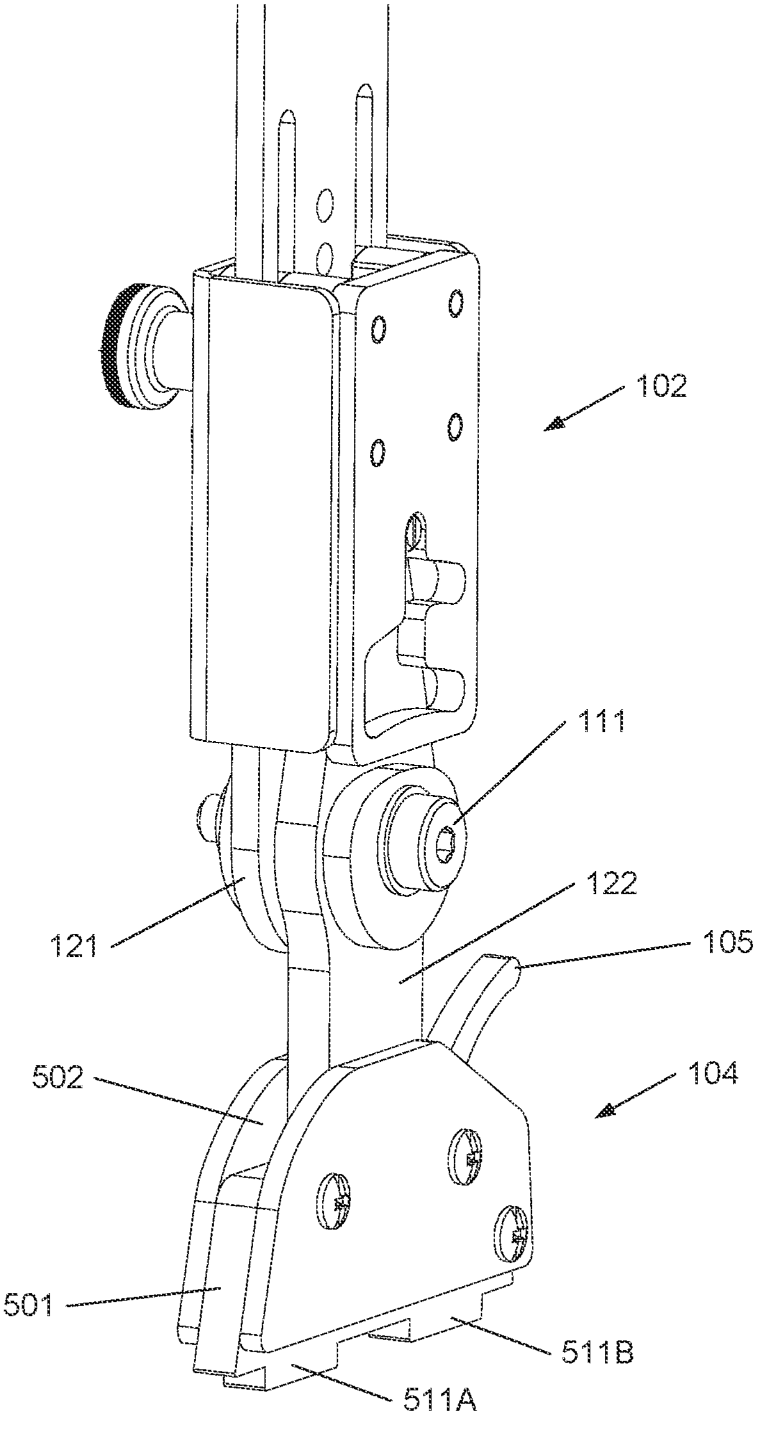
FIG. 5 illustrates a first perspective view of the pivoting mechanism and a locking mechanism, in accordance with the disclosed technology.

Referring now to FIG. 5, illustrated is a first perspective view of the pivoting mechanism 102 attached to the locking mechanism 104, according to the disclosed technology. The locking mechanism 104 can include one or more feet 511A-511B extending from a locking port 501. The one or more feet 511A-511B can insert into the upper portion 301 of the footplate base assembly 101. The one or more feet 511A-511B can function to secure the locking mechanism 104 to the upper portion 301 of the footplate base assembly 101. For example, the one or more feet 511A-511B can be fixed to the upper portion 301 of the footplate base assembly 101 using welding, epoxy resin, and/or any particular fixing technique. The locking port 501 can exclude the feet 511A-511B. Alternatively or in addition, the locking port 501 can attach to the footplate base assembly 101 through other attachment configurations. For example, the locking port 501 can be screwed, welded, glued, pinned, or otherwise fixed to the footplate base assembly 101.

The locking port 501 can receive the footplate base connector 122. The locking port 501 can be located within an enclosure 502. The footplate base connector 122 can be inserted into the locking port 501 and removably affixed to within the locking port 501. The footplate base connector 122 and the lower leg support arm 121 can rotationally attach together through the hinge 111. The hinge 111 can include a bolt, a pin, a nut, a ball bearing, and/or any other system that can support the rotation of the footplate base connector 122 and/or the lower leg support arm 121 about the hinge 111. For example, the hinge 111 can include a thrust bearing and/or a thrust washer, which can help facilitate the rotation of the footplate base connector 122 and/or the lower leg support arm 121 about the hinge 111.

Figure 6:
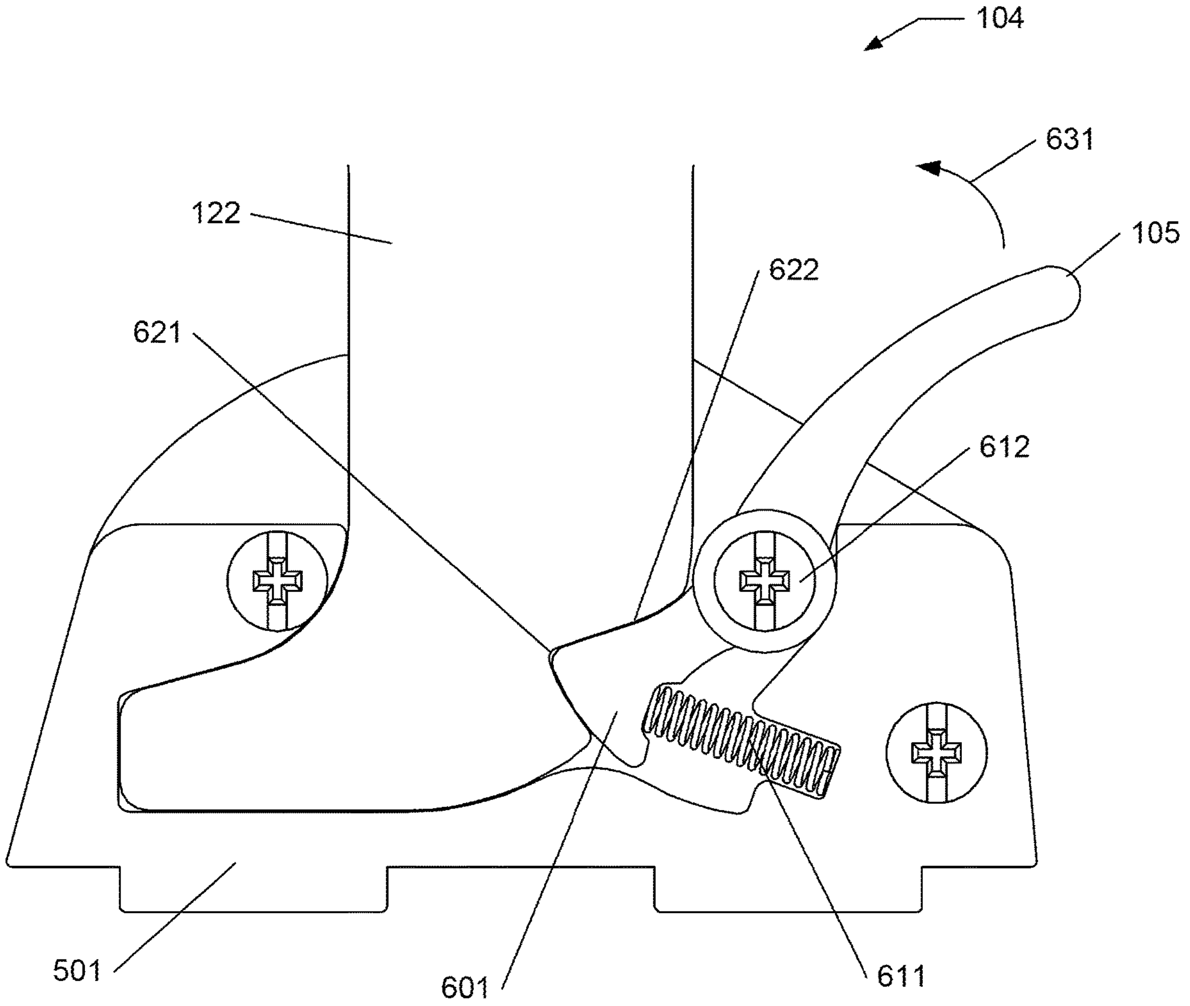
FIG. 6 illustrates a cross-sectional view of the locking mechanism, in accordance with the disclosed technology.

Referring now to FIG. 6, illustrated is a cross section view of the locking mechanism 104, according to the disclosed technology. The locking mechanism 104 can attach to the footplate base assembly 101. The locking mechanism 104 can function to receive the footplate base connector 122. By receiving the footplate base connector 122, the locking mechanism 104 can secure the footplate base connector 122, the lower leg support arm 121, and the shin support portion 103 to the footplate base assembly 101.

The locking mechanism 104 can include a spring loaded lock 601. The spring loaded lock 601 can include a spring 611. Though illustrated as a classical spring, the spring 611 can include any mechanism (e.g., a motor, a pin) that exerts a force onto the spring loaded lock 601 or otherwise attaches or locks the footplate base connector 122 to the footplate base assembly 101 (e.g., via the locking mechanism 104). The spring loaded lock 601 can hook to the footplate base connector 122 when inserted into the locking port 501. For example, the spring 611 can apply pressure onto the footplate base connector 122 through the spring loaded lock 601. The spring loaded lock 601 can apply pressure to the footplate base connector 122 such that the spring loaded lock 601 can fix the footplate base connector 122 within the locking mechanism 104. The spring loaded lock 601 can include a locking portion 622 and the footplate base connector 122 can include a locking recess 621. The locking recess 621 can receive the locking portion 622. The locking portion 622 can restrict the movement of the footplate base connector 122 such that the footplate base connector 122 can be secured within the locking mechanism 104.

The spring loaded lock 601 can be compressed to release the footplate base connector 122. For example, the spring loaded lock 601 (e.g., a lever handle 105) can be moved in a first direction 631. By moving the spring loaded lock 601 in the first direction 631, the spring loaded lock can rotate about a locking joint 612. The locking joint 612 can include a screw, a bolt, a pin, and/or any particular rotational connection such that the spring loaded lock 601 can rotate about the locking joint 612. On rotating about the locking joint 612, the spring loaded lock 601 can compress the spring 611 and uncouple the locking portion 622 from the locking recess 621. Once the locking portion 622 of the spring loaded lock 601 is uncoupled from the locking recess 621, the footplate base connector 122 can be removed from the locking port 501 and the locking mechanism 104. The locking joint 601 can be released. On releasing the locking joint 601, the spring 611 can expand such that the locking point 601 returns to its locking position. The force of inserting the footplate base connector 122 can slightly compress the spring 601 allowing the locking portion 622 to recouple with the locking recess 621.

Figure 7:
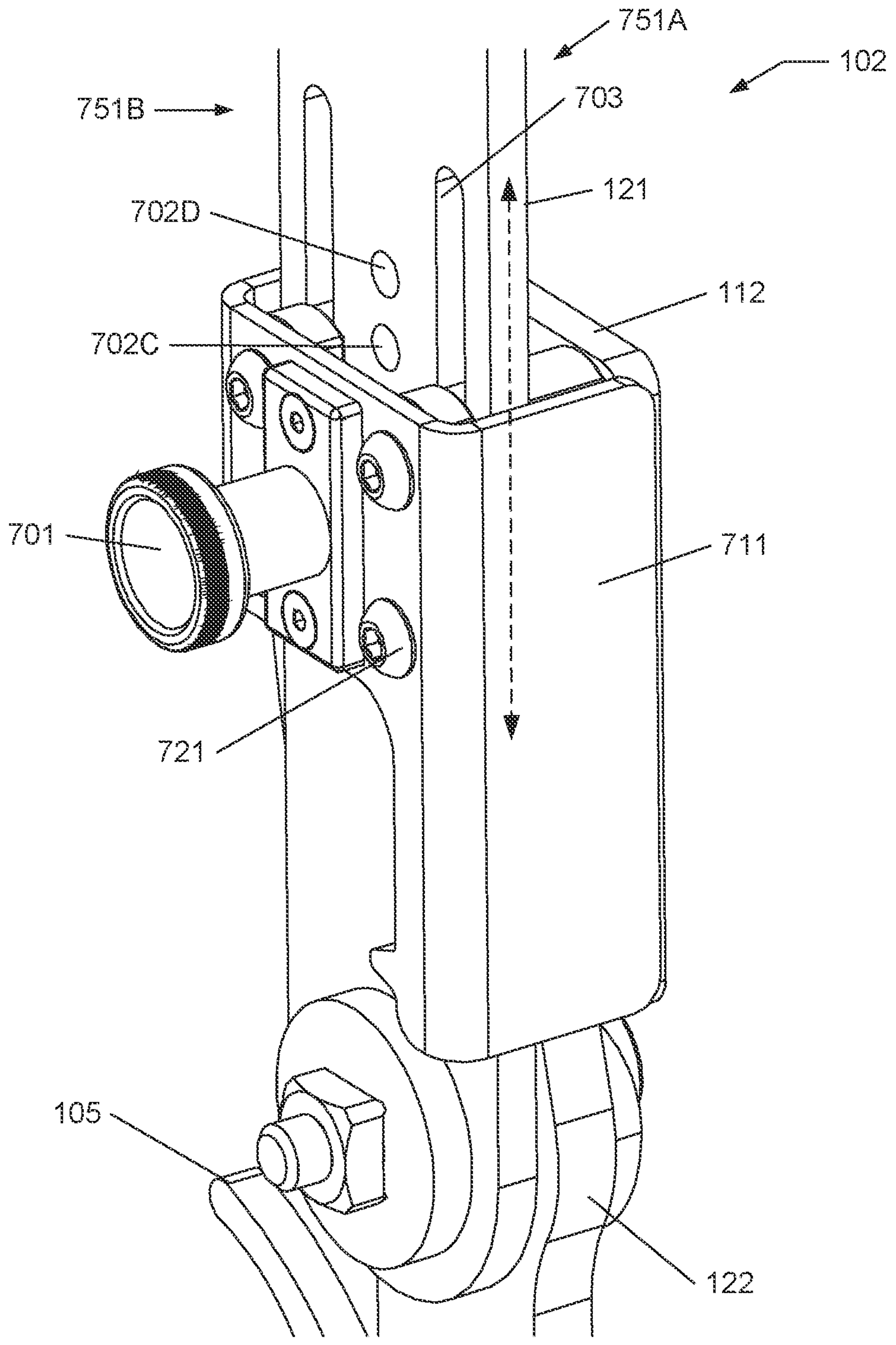
FIG. 7 illustrates a second perspective view of the pivoting mechanism, in accordance with the disclosed technology.

Referring now to FIG. 7, illustrated is a second perspective view of the pivoting mechanism 102, according to the disclosed technology. The pivoting mechanism 102 can regulate the range of motion of the footplate base connector 122 about the lower leg support arm 121. The pivoting mechanism 102 can include the motion selection plate 112. The pivoting mechanism 102 can include a motion selector 701, a secondary plate 711, and one or more pins 721.

The motion selector 701 can connect to a central portion of the secondary plate 711. The secondary plate 711 can partially surround the lower leg support arm 121. The secondary plate 711 can connect to the motion selection plate 112. For example, the motion selection plate 112 can be welded to the secondary plate 711 to form a rectangular configuration. In another example, the secondary plate 711 and the motion selection plate 112 can be manufactured as one continuous rectangular object. In yet another example, the motion selection plate 112 is fixed to the secondary plate 711 through the one or more pins 721. The one or more pins 721 can extend through the secondary plate 711 and one or more attachment paths 703 of the lower leg support arm 121 to attach to the motion selection plate 112. The one or more pins 721 can move freely within the attachment paths 703 of the lower leg support arm 121. For example, the user can move the motion selection plate 112 parallel to and vertically along the lower leg support arm 121 by raising and lowering the motion selector 701. The secondary plate 711 and the motion selection plate 112 can fully surround the lower leg support arm 121. The secondary plate 711 and the motion selection plate 112 can move freely and parallel to the lower leg support arm 121.

The motion selector 701 can function substantially similarly to the alignment selector 303. For example, the motion selector 701 can include a pin and spring system. The pin and spring system of the motion selector 701 can extend through one or more motion selection apertures 702A-702D (the motion selection apertures 702A-702B can be shown in FIG. 8). Each of the motion selection apertures 702A-702D can correspond with each of the positions of the motion selection plate 112 (see FIG. 1 for details on the one or more positions of the motion selection plate 112). The pin and spring system of the motion selector 701 can insert into one of the motion selection apertures 702A-702D such that the motion selection plate can be fixed to the lower leg support arm 121. A user can pull the motion selector 701 to free the pin and spring system from one of the motion selection apertures 702A-702D. By pulling the motion selector 701 from one of the motion selection apertures 702A-702D, the motion selection plate 112 and the secondary plate 711 came move freely about the lower leg support arm 121.

The motion selection plate 112 can be positioned on a first side 751A of the lower leg support arm 121, and the motion selector 701 can be positioned on a second side 751B of the lower leg support arm 121, as non-limiting examples. The first side 751A can be opposite to the second side 751B.

Figure 8:
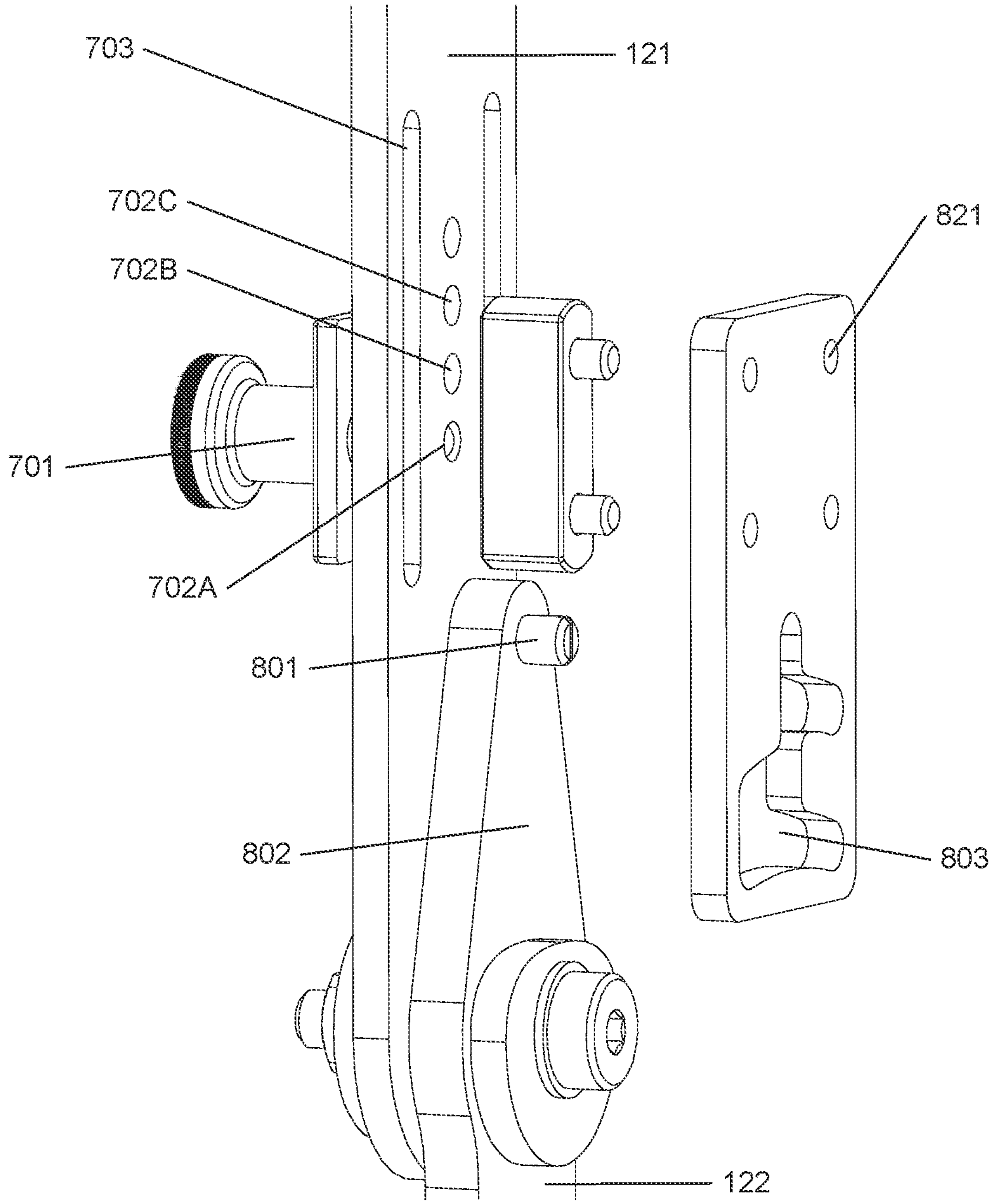
FIG. 8 illustrates an exploded view of the pivoting mechanism, in accordance with the disclosed technology.

Referring now to FIG. 8, illustrated is an exploded-view of the pivoting mechanism 102, according to the disclosed technology. The motion selection plate 112 can include a cutout 803. The cutout 803 can be substantially continuous. Stated otherwise, each portion of the cutout 803 can be connected to every other portion of the cutout 803. The cutout 803 can be manufactured through any particular cutting and/or manufacturing technique. For example, the cutout 803 can be created using computer numerical control (CNC) cutting techniques. In another example, the motion selection plate 112 is manufactured with the cutout 803 (e.g., through additive manufacturing techniques, casting).

The cutout 803 can restrict the motion of the lower leg support arm 121 relative to the footplate base connector 122. The footplate base connector 122 can include a motion arm 802 and a motion pin 801. The motion pin 801 can insert into the cutout 803 of the motion selection plate 112. As a component of the motion selection plate 112 operatively fixed to the lower leg support arm 121, the cutout 803 can stay at a constantly fixed position. The motion pin 801 can insert into one or more regions 901A-901D (see FIG. 9) of the cutout 803. Each of the regions 901A-901D can define a motion performed by the lower leg support arm 121 relative to the footplate base assembly 101 (e.g., plantarflexion motion, dorsiflexion motion). The motion selector 701 can define the region 901A-901D in which the motion pin 801 is confined within. For example, when the motion selector 701 is inserted into the motion selection aperture 702A, the motion pin 801 can be confined to a first region 901A. Alternatively or in addition, when the motion selector 701 is inserted into the motion selection aperture 702B, the motion pin 801 can be confined to a second region 901B. Alternatively or in addition, when the motion selector 701 is inserted into the motion selection aperture 702C, the motion pin 801 can be confined to a third region 901C. Alternatively or in addition, when the motion selector 701 is inserted into the motion selection aperture 702D, the motion pin 801 can be confined to a third region 901D. More or fewer regions and motion selection apertures can be included.

Based on the region 901A-901D in which the motion pin 801 is inserted into, the motion pin 801 can restrict the motion of the motion arm 802. As the motion arm 802 can be one continuous component of the footplate base connector 122, restricting the movement of the motion arm 802 can also restrict the movement of the footplate base assembly 101. By fixing the motion selection plate 112 to the lower leg support arm 121, the motion selection plate 112 can be fixed relative to the movements of the motion arm 802 and the motion pin 801.

The pins 721 can extend through the motion selection plate 112 at one or more pin apertures 821. The pins 721 can fix the motion selection plate 112 to the secondary plate 711. By extending through the attachment paths 703, the pins 721 can fix the motion selection plate 112 to the secondary plate 711 while simultaneously allowing the motion selection plate 112 to move vertically along the lower leg support arm 121.

Figure 9:
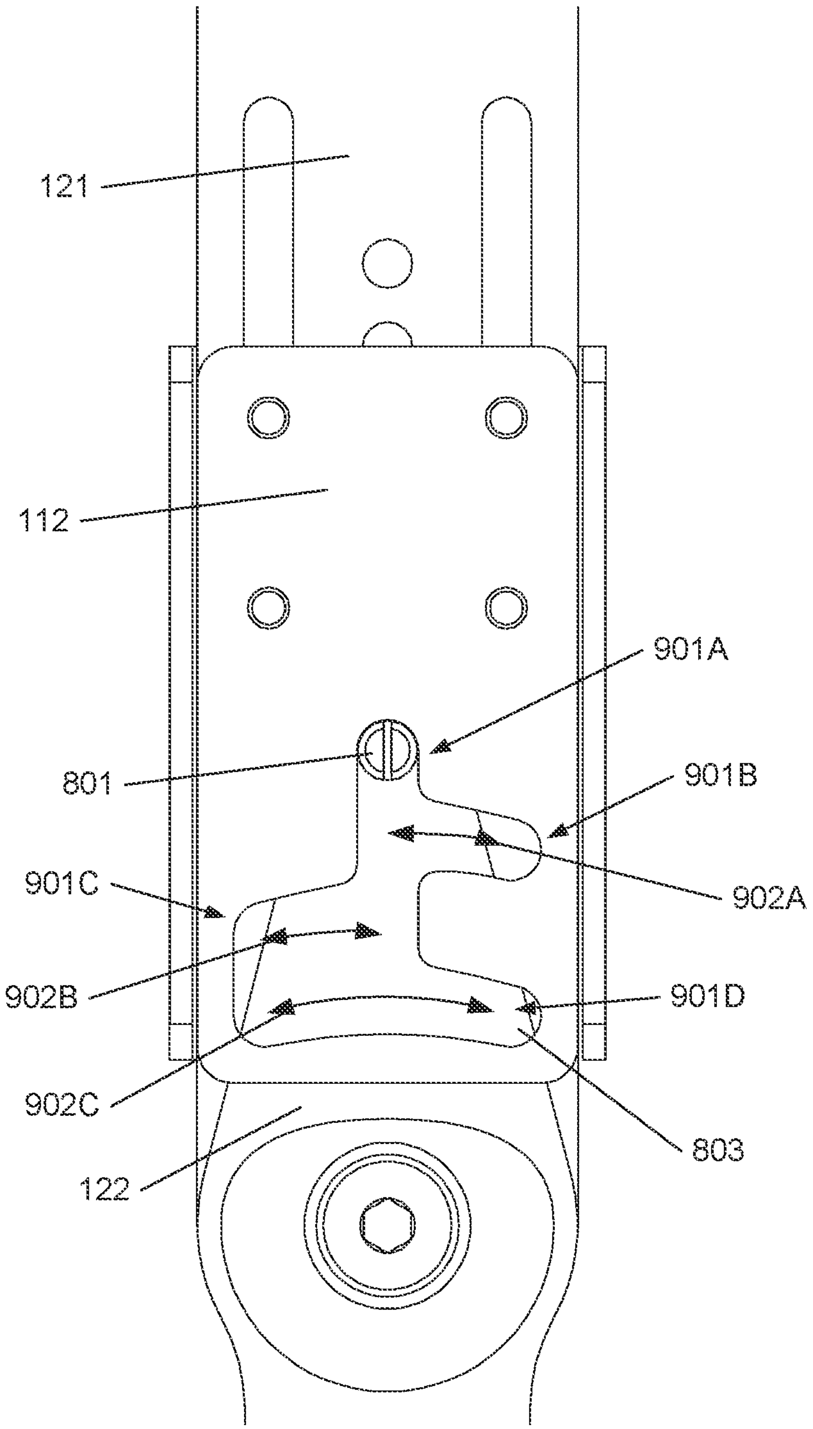
FIG. 9 illustrates a side view of the pivoting mechanism, in accordance with the disclosed technology.

Referring now to FIG. 9, illustrated is a side view of the pivoting mechanism 102, according to the disclosed technology. The motion selection plate 112 can include the cutout 803. The cutout 803 can include one or more regions 901A-901D. The motion pin 801 can insert into each of the regions 901A-901D, where each region can generate a different motion in the footplate base connector 122. For example, in the first region 901A, the motion pin 801 can be fixed in place. Stated otherwise, the first region 901A can maintain the footplate base connector 122 in a static position and/or prevent the footplate base connector 122 from rotating relative to the lower leg support arm 121, or vice versa. The footplate base assembly 101 can be in a neutral position when the motion pin 801 is confined to the first region 901.

The motion selection plate 112 can be moved such that the position of the motion pin 801 can be within the second region 901B. The second region 901B can corresponding to a first predetermined angular distance (and/or first arc length) that can be traveled by the footplate base assembly 101 relative to the shin support assembly 110, or vice versa (e.g., the shin support assembly 110 can travel the first predetermined angular distance relative to the footplate base assembly 101). The second region 901B can allow the motion pin 801 and the motion arm 802 to perform a first movement 902A. The first movement 902A can correspond to dorsiflexion motion.

The motion selection plate 112 can be moved such that the position of the motion pin 801 can be within the third region 901C. The third region 901C can corresponding to a second predetermined angular distance (and/or second arc length) that can be traveled by the footplate base assembly 101 relative to the shin support assembly 110, or vice versa. The third region 901C can allow the motion pin 801 and the motion arm 802 to perform a second movement 902B. The second movement 902B can correspond to plantarflexion motion.

The motion selection plate 112 can be moved such that the position of the motion pin 801 can be within the fourth region 901D. The fourth region 901D can corresponding to a third predetermined angular distance (and/or third arc length) that can be traveled by the footplate base assembly 101 relative to the shin support assembly 110, or vice versa. The fourth region 901D can allow the motion pin 801 and the motion arm 802 to perform a third movement 902C. The third movement 902C can correspond a range of motion including both dorsiflexion motion and plantarflexion motion.

While specific regions 901A-901D have been discussed herein, the disclosed technology is not so limited. Indeed, the third region can correspond to any predetermined angle or angle range. As non-limiting examples, a given region 901 can correspond to a range of motion extending between 5° plantarflexion and 15° dorsiflexion, a range of motion extending between 15° plantarflexion and 5° dorsiflexion, a range of motion extending between 0° dorsiflexion and 10° plantarflexion, a range of motion extending between 10° dorsiflexion and 0° plantarflexion, or a range of motion extending between 10° dorsiflexion and 10° plantarflexion (with such ranges inclusive of endpoints).

Referring now to FIG. 10, an example gait training machine 1000 is illustrated, in accordance with the disclosed technology. The gait training machine 1000 can include various components and/or perform various functionalities, such as those described in U.S. patent application Ser. No. 17/875,038, filed Jul. 27, 2022, entitled “Rehabilitation Device Providing Locomotion Training and Method of Use,” U.S. patent application Ser. No. 16/902,836, filed Jun. 16, 2020, now U.S. Pat. No. 11,432,985, entitled “Rehabilitation Device Providing Locomotion Training and Method of Use,” U.S. patent application Ser. No. 16/565,131, filed Sep. 9, 2019, now U.S. Pat. No. 10,736,808, entitled “Rehabilitation Device Providing Locomotion Training and Method of Use,” and/or U.S. Provisional Patent App. No. 62/728,762, filed Sep. 8, 2018, entitled “Rehabilitation Device Providing Locomotion Training and Method of Use,” the entire contents of which are incorporated by reference as if fully set forth herein. The gait training machine 1000 can support a user during rehabilitation procedures. Rehabilitation procedures can include various exercises that train or retrain the user to perform various segments of the gait cycle. As discussed herein, the gait cycle can mimic movements performed by the human body to produce a proper walking motion (and can guide a user through execution of such movements).

The gait training machine 1000 can include various components for supporting, aiding, guiding, and/or assisting various body parts during one or more gait training exercises or movements. The gait training machine 1000 can include, for example, a tower 1001 and a sled 1002. The tower 1001 and the sled 1002 can attach to a track 1003. The tower can include a bodyweight support system 1021. The tower 1001 can support the weight of the user through the bodyweight support system 1021 and/or other components. For example, a user can be strapped into the bodyweight support system 1021, such that the user is at least partially suspended from the bodyweight support system 1021. The bodyweight support system 1021 can alleviate a variable amount of weight that would otherwise need to be supported by the user.

The sled 1002 can function as a motorized system that can induce movements into the feet, legs, hands, and arms of the user. For example, the sled 1002 can include an internal motor and/or other mechanical components (not shown) to induce and/or coordinate movements with respect to the various components of the gait training system 1000. The sled 1002 can include two handles 1012 (e.g., one for either hand). The sled 1002 can cause the handles 1012 to move, and the handles 1012 can in turn cause the hands of the user to move in a particular fashion, such as following a proper gait cycle. The handles 1012 can move relative to the articulating footplates 100 such that the movement of the handles 1012 are synchronized with the movements of the articulating footplates 100 and in accordance with the proper gait cycle.

The sled 1002 can include the attachment arms 1011. The attachment arms 1011 can form a connection between the internal motor of the sled 1011 and the articulating footplates 100. The sled 1002 can induce a movement into the attachment arms 1011 and the articulating footplates 100. For example, the attachment arms 1011 can attach to the articulating footplates 100 at the one or more attachment ports 321A-321B. Continuing this example, the internal motor of the sled 1002 can induce a foot-path motion into the articulating footplates 100. The foot-path motion can include a forward and/or backward motion that mimics a foot moving forwards and/or backwards relative to the user’s stationary upper body, torso, and/or hips during the gait cycle. The internal motor of the sled 1002 can cause a pushing and/or pulling force onto the articulating footplates 100 such that the articulating footplates 100 move along the foot-path motion typical to the gait cycle. The sled 1002 can cause the two articulating footplates 100 to perform opposite motions such that the feet move oppositely to one another, a process common to the gait cycle. The foot-path motion can include a vertical and horizontal component. For example, a particular attachment arm 1011 can push a corresponding articulating footplate 100 backwards (e.g., in a horizontal direction) between a heel strike and toe off phase of the gait cycle. Continuing this example, the particular attachment arm 1011 can slightly raise the corresponding articulating footplate 100 in a vertical direction to mimic a pre-swing motion performed by the foot and leg prior to extending forward during the gait cycle.

As the articulating footplates 100 moves along the foot-path motion, the lower leg support arm 121 can pivot about the hinge 111. The lower leg support arm 121 can pivot about the hinge 111 to promote the dorsiflexion and/or plantarflexion motion common to the gait cycle. For example, the lower leg support arm 121 can pivot about the hinge 111 such that the foot of the user can perform the dorsiflexion motion between a foot flat phase and a heel off phase of the gait cycle. In another example, the lower leg support arm 121 can pivot about the hinge 111 such that the foot of the user can perform the plantarflexion motion between the heel strike phase and the foot flat phase of the gait cycle. The lower leg support arm 121 can be removed. By removing the lower leg support arm 121 the user can perform the gait cycle with less support and greater difficulty.

The foregoing description of the example embodiments has been presented only for the purposes of illustration and description and is not intended to be exhaustive or to limit the innovations to the precise forms disclosed. Many modifications and variations are possible in light of the above teaching.

The embodiments were chosen and described in order to explain the principles of the claimed innovations and their practical application so as to enable others skilled in the art to utilize the innovations and various embodiments and with various modifications as are suited to the particular use contemplated. Alternative embodiments will become apparent to those skilled in the art to which the claimed innovations pertain without departing from their spirit and scope. Accordingly, the scope of the claimed innovations is defined by the appended claims rather than the foregoing description and the example embodiments described therein.

What is claimed is:

1. An articulating footplate apparatus comprising:
- a footplate base comprising;
  - a top surface configured to support a foot of a user; and
  - a locking mechanism extending perpendicularly from the footplate base, the locking mechanism configured to receive at least a portion of a footplate base connector of a lower leg support assembly, the locking mechanism comprising:
    - a locking enclosure;
    - a locking port extending into the locking enclosure;
    - a protruding portion configured to at least partially insert into a notch or recess of the footplate base connector;
    - a spring biased to force the protruding portion against the notch or recess of the footplate base connector; and
    - a release portion configured to release the footplate base connector from the locking mechanism;
- the lower leg support assembly, wherein the lower leg support assembly is configured to extend along a portion of a leg of the user, the lower leg support assembly comprising:
  - a first end and a second end opposite the first end;
  - the footplate base connector, wherein the footplate base connector is located at the first end, and the footplate base connector is detachably attachable to the footplate base; and
  - a pivoting mechanism comprising:
    - a pivot point; and
    - a rotation selection device configured to selectively permit rotation about the pivot point, the rotation selection device comprising a plurality of discrete rotation settings, each rotation setting being configured to permit rotation about the pivot point along a corresponding predetermined angular distance.

2. The articulating footplate apparatus of claim 1, wherein the release portion comprises a lever configured to selectively compress the spring and permit the protruding portion to move out of the notch or recess of the footplate base connector to thereby release the footplate base connector from the locking mechanism.

3. The articulating footplate apparatus of claim 1, wherein the lower leg support assembly comprises a shin support located proximate the second end of the lower leg support assembly, the shin support being configured to provide resistance against the leg of the user when the articulating footplate apparatus rotates about the pivot point.

4. The articulating footplate apparatus of claim 3, wherein the shin support comprises:
- a cushion; and
- a leg strap are configured to restrain the leg of the user against the cushion.

5. The articulating footplate apparatus of claim 3, wherein the shin support further comprises:
- a depth adjustment plate configured to slideably move along one or more depth adjustment guides secured at a location proximate the second end of the lower leg support assembly; and
- a depth selector configured to selectively and releasably secure the depth adjustment plate at a plurality of depth positions along the one or more depth adjustment guides, each of the plurality of depth positions corresponding to a different location along a depth axis parallel to a front-to-rear axis of the footplate base.

6. The articulating footplate apparatus of claim 3, wherein the shin support further comprises:
- a first adjustment plate;
- a second adjustment plate; and
- an attachment device comprising a pin, the attachment device being configured to selectively and releasably attach the first adjustment plate to the second adjustment plate,
- wherein:
  - at least one of the first or second adjustment plates comprises a height adjustment aperture and a width adjustment aperture,
  - the height adjustment aperture extends in a vertical direction that is perpendicular to the top surface of the footplate base,
  - the width adjustment aperture extends in a horizontal direction that is perpendicular to the vertical direction,
  - the pin of the attachment device is configured to extend through the height adjustment aperture and the width adjustment aperture, and
  - when the attachment device is in a released configuration, a pin of the attachment device is configured to slideably move along the height adjustment aperture and the width adjustment aperture to a plurality of height/width positions.

7. The articulating footplate apparatus of claim 1, wherein:
- the lower leg support assembly comprises a plurality of apertures located within a portion of the lower leg support assembly; and
- the rotation selection device comprises:
  - a motion selection plate configured to slide along the portion of the lower leg support assembly, the motion selection plate comprising one or more cutouts comprising a plurality of regions, each region configured to permit or restrict a different amount of rotation about the pivot point;
  - a motion arm attached to the lower leg support assembly, the motion arm comprising a motion pin configured to extend into the one or more cutouts; and
  - a motion selector comprising a motion selector pin configured to selectively extend at least partially into the plurality of apertures.

8. The articulating footplate apparatus of claim 7, wherein:
- when the motion selector pin is at least partially extended into a first aperture of the plurality of apertures, the motion pin is aligned with a first region of the plurality of regions, and when the motion selector pin is at least partially extended into a second aperture of the plurality of apertures, the motion pin is aligned with a second region of the plurality of regions.

9. An articulating footplate apparatus comprising:

a footplate base comprising a top surface configured to support a foot of a user;

a lower leg support assembly configured to extend along a portion of a leg of the user, the lower leg support assembly comprising:

a first end and a second end opposite the first end;

a footplate base connector located at the first end, the footplate base connector being attachable to the footplate base; and a pivoting mechanism comprising:

a pivot point; and a rotation selection device configured to selectively permit rotation about the pivot point, the rotation selection device comprising a plurality of discrete rotation settings, each rotation setting being configured to permit rotation about the pivot point along a corresponding predetermined angular distance, wherein:

the lower leg support assembly comprises a plurality of apertures located within a portion of the lower leg support assembly;

the rotation selection device comprises:

a motion selection plate configured to slide along the portion of the lower leg support assembly, the motion selection plate comprising one or more cutouts comprising a plurality of regions, each region configured to permit or restrict a different amount of rotation about the pivot point;

a motion arm attached to the lower leg support assembly, the motion arm comprising a motion pin configured to extend into the one or more cutouts; and a motion selector comprising a motion selector pin configured to selectively extend at least partially into the plurality of apertures; and the plurality of regions comprises at least two of:

a first region configured to prevent rotation about the pivot point;

a second region configured to permit rotation about the pivot point along a first predetermined angular distance corresponding to a dorsiflexion motion;

a third region configured to permit rotation about the pivot point along a second predetermined angular distance corresponding to a plantarflexion motion; or a fourth region configured to permit rotation about the pivot point along a third predetermined angular distance corresponding to the dorsiflexion motion and the plantarflexion motion.

10. The articulating footplate apparatus of claim 9, wherein the plurality of regions comprises at least three of the first region, the second region, the third region, or the fourth region.

11. The articulating footplate apparatus of claim 1 further comprising a strap assembly configured to detachably attach the foot of the user to the footplate base, the strap assembly comprising:

one or more straps, each strap comprising a first end and a second end;

one or more tether portions extending from a heel support of the footplate base; and one or more attachment mechanisms configured to releasably and adjustably secure the one or more straps and the one or more tether portions.

12. The articulating footplate apparatus of claim 11, wherein:

the one or more straps comprises a first strap extending underneath the top surface of the footplate base and having a first buckle portion located proximate the first end of the first strap and a first magnet located proximate the second end of the first strap;

the one or more tether portions includes a first tether portion and a second tether portion;

the first tether portion comprises a second buckle portion configured to releasably attach to the first buckle portion; and the second tether portion comprises a second magnet complementary to the first magnet.

13. The articulating footplate apparatus of claim 12, wherein the second tether portion further comprises a ratcheting device configured to selectively tighten or loosen the second tether portion.

14. A gait training system comprising:

a first articulating footplate and a second articulating footplate, wherein, each of the first and second articulating footplates comprises:

a footplate base comprising a top surface configured to support a foot of a user;

a lower leg support assembly configured to extend along a portion of a leg of the user, the lower leg support assembly comprising:

a first end and a second end opposite the first end;

a footplate base connector located at the first end, the footplate base connector being attachable to the footplate base; and a pivoting mechanism comprising:

a pivot point; and a rotation selection device configured to selectively permit rotation about the pivot point, the rotation selection device comprising a plurality of discrete rotation settings, each rotation setting being configured to permit rotation about the pivot point along a corresponding predetermined angular distance, wherein for each of the first and second articulating footplates:

the lower leg support assembly comprises a plurality of apertures located within a portion of the lower leg support assembly;

the rotation selection device comprises:

a motion selection plate configured to slide along the portion of the lower leg support assembly, the motion selection plate comprising one or more cutouts comprising a plurality of regions, each region configured to permit or restrict a different amount of rotation about the pivot point;

a motion arm attached to the lower leg support assembly, the motion arm comprising a motion pin configured to extend into the one or more cutouts; and a motion selector comprising a motion selector pin configured to selectively extend at least partially into the plurality of apertures; and the plurality of regions comprises at least two of:

a first region configured to prevent rotation about the pivot point;

a second region configured to permit rotation about the pivot point along a first predetermined angular distance corresponding to a dorsiflexion motion;

a third region configured to permit rotation about the pivot point along a second predetermined angular distance corresponding to a plantarflexion motion; or a fourth region configured to permit rotation about the pivot point along a third predetermined angular distance corresponding to the dorsiflexion motion and the plantarflexion motion.

15. The gait training system of claim 14, wherein for each of the first and second articulating footplates:

when the motion selector pin is at least partially extended into a first aperture of the plurality of apertures, the motion pin is aligned with a first region of the plurality of regions, and when the motion selector pin is at least partially extended into a second aperture of the plurality of apertures, the motion pin is aligned with a second region of the plurality of regions.

16. The gait training system of claim 14, wherein, for either of the first or second articulating footplates, wherein the plurality of regions comprises at least three of the first region, the second region, the third region, or the fourth region.

17. The gait training system of claim 14, wherein, for either of the first or second articulating footplates, the footplate base connector is detachably attachable to the footplate base.

18. The gait training system of claim 14, wherein, for either of the first or second articulating footplates, the footplate base further comprises a locking mechanism comprising:

a locking enclosure;

a locking port extending into the locking enclosure;

a protruding portion configured to at least partially insert into a notch or recess of the footplate base connector;

a spring biased to force the protruding portion against the notch or recess of the footplate base connector; and a release portion configured to release the footplate base connector from the locking mechanism.

* * * * *